United States Patent
Watkins et al.

(10) Patent No.: US 6,526,229 B2
(45) Date of Patent: Feb. 25, 2003

(54) CAMERA HAVING A FILMSTRIP HOLDFAST SPACED APART FROM A FILM PATH AND TRANSPORTABLE CAMERA INTERMEDIATE

(75) Inventors: Joseph A. Watkins, Rochester, NY (US); Peter A. Wacht, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/843,394

(22) Filed: Apr. 26, 2001

(65) Prior Publication Data

US 2002/0176706 A1 Nov. 28, 2002

(51) Int. Cl.⁷ ............................. G03B 17/02; G03B 1/00
(52) U.S. Cl. ........................... 396/6; 346/388; 346/415
(58) Field of Search ........................... 396/6, 388, 411, 396/415; 346/440

(56) References Cited

U.S. PATENT DOCUMENTS

| 4,477,162 A | 10/1984 | Matsumoto | 396/406 |
|---|---|---|---|
| 5,530,506 A | 6/1996 | Zander | 396/415 |
| 5,530,507 A | 6/1996 | Boyd | 396/6 |
| 5,619,740 A | 4/1997 | Onda et al. | 396/415 |
| 5,666,581 A | 9/1997 | Kamoda | 396/415 |
| 5,721,964 A | 2/1998 | Pearson | 396/6 |
| 5,797,045 A | 8/1998 | Watkins et al. | 346/6 |
| 5,970,257 A | * 10/1999 | Watkins et al. | 396/6 |
| 6,190,061 B1 | 2/2001 | DiRisio | 396/511 |

FOREIGN PATENT DOCUMENTS

EP  0 926 541 A1  6/1999

* cited by examiner

Primary Examiner—David M. Gray
Assistant Examiner—Rochelle Blackman
(74) Attorney, Agent, or Firm—Robert Luke Walker

(57) ABSTRACT

In a camera frame assembly, a frame includes a film return chamber, a film roll chamber spaced apart from the film return chamber, and a midsection extending between the chambers. The midsection has a pair of film guide surfaces that define a film path between the chambers. A holdfast is joined in fixed relation to the midsection adjacent the film roll chamber. The holdfast extends outward from the midsection toward the film path. The holdfast is fully outside the film path. A film unit has a film holder and a filmstrip. The film holder is seated in the film return chamber. The filmstrip has a leading portion having a free end and a grip adjoining the free end. The filmstrip has a main portion adjoining the leading portion. The filmstrip is movable between a first position in which the grip engages the holdfast and a second position in which the main portion occupies the film path and extends from one of the chambers to the other. A camera and transportable camera intermediate likewise have a holdfast and grip.

25 Claims, 19 Drawing Sheets

GO TO FIGURE 2A OR 2B

CAMERA HAVING A FILMSTRIP HOLDFAST SPACED APART FROM A FILM PATH AND TRANSPORTABLE CAMERA INTERMEDIATE

CROSS REFERENCE TO RELATED APPLICATIONS

Reference is made to commonly assigned, co-pending U.S. patent application Ser. No. 09/843,220, entitled: ONE-TIME USE CAMERA ASSEMBLY PROCESS HAVING FILMSTRIP ANCHORED DURING CAMERA FRAME ASSEMBLY TRANSPORT, filed Apr. 26, 2001, in the names of Joseph A. Watkins and Peter A. Wacht.

FIELD OF THE INVENTION

The invention relates to film photography and photographic equipment and processes and more particularly relates to a camera having a film path and a filmstrip holdfast spaced apart from the film path and a transportable camera intermediate.

BACKGROUND OF THE INVENTION

One-time use cameras are cameras that are provided to consumers in preloaded form and cannot be reloaded, by the consumer, without extensive camera disassembly, or replacement of parts, or use of special tools, or the like. A variety of assembly processes are known for one-time use cameras. Assembly can be automated, or partially automated, or almost entirely manual. Automated procedures tend to be faster, but less flexible than manual procedures. Automated procedures are particularly suitable for film winding, especially with cameras that require film winding in a dark enclosure.

One variety of one-time use camera assembly methods combines automated film winding with the use of manual procedures prior to film winding. These methods have a transition from manual operations to automated operations. In the transition, the uncompleted cameras are transported from one or more manual stations to the automated winding equipment. The transport is provided by whatever means is convenient. The uncompleted cameras are subjected to rough handling. During transport, the uncompleted cameras are minimally restrained and subject to rapid accelerations and decelerations. The filmstrips carried by the uncompleted cameras cannot be prepositioned prior to transport, by unconstrained placement in a required position; since the filmstrips will not reliably stay in place during rough handling. The filmstrips could be constrained in some manner, but any constraint must not unacceptably degrade film winding or the completed cameras.

It would thus be desirable to provide improved cameras, camera frame assemblies, and transportable camera intermediates which allow for reliable prepositioning without unacceptably degrading film winding or performance of the completed cameras.

SUMMARY OF THE INVENTION

The invention is defined by the claims. The invention, in its broader aspects, provides a camera frame assembly that has a frame including a film return chamber, a film roll chamber spaced apart from the film return chamber, and a midsection extending between the chambers. The midsection has a pair of film guide surfaces that define a film path between the chambers. A holdfast is joined in fixed relation to the midsection adjacent the film roll chamber. The holdfast extends outward from the midsection toward the film path. The holdfast is fully outside the film path. A film unit has a film holder and a filmstrip. The film holder is seated in the film return chamber. The filmstrip has a leading portion having a free end and a grip adjoining the free end. The filmstrip has a main portion adjoining the leading portion. The filmstrip is movable between a first position in which the grip engages the holdfast and a second position in which the main portion occupies the film path and extends from one of the chambers to the other. A camera and transportable camera intermediate likewise have a holdfast and grip.

It is an advantageous effect of the invention that improved cameras, camera frame assemblies, and transportable camera intermediates are provided which allow for reliable prepositioning without unacceptably degrading film winding or performance of the completed cameras.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 2b is a diagrammatical view of a modification of the final steps of FIG. 2a.

FIG. 2c is a diagrammatical view illustrating the grabbing step of the method of FIG. 2a.

DETAILED DESCRIPTION OF THE INVENTION

Figure 1:
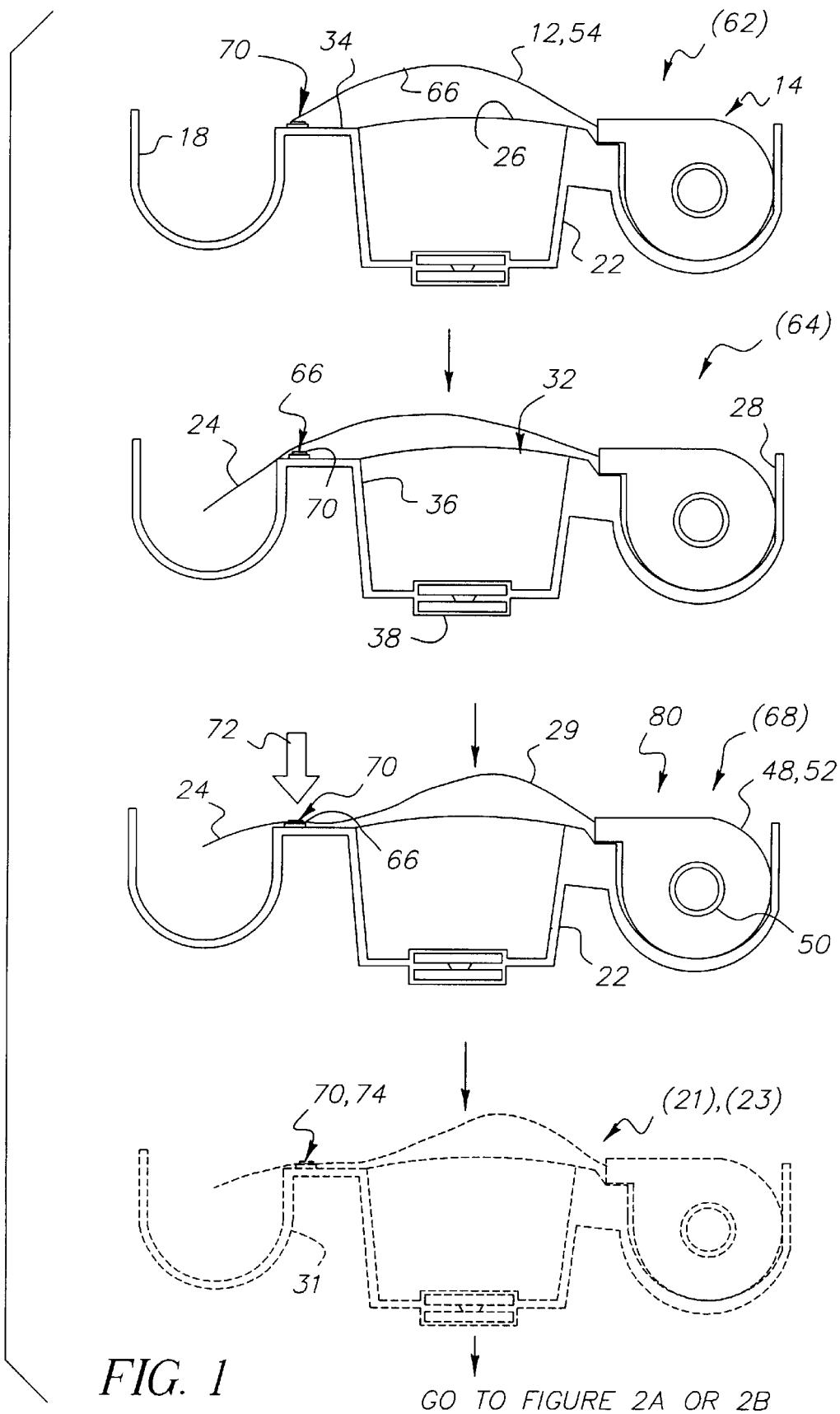
FIG. 1 is a diagrammatical view of the initial steps of an embodiment of the film camera production method. The camera frame is shown in cross-section. The shape of the camera frame is simplified for clarity.

In the film camera production methods, a main portion 10 of a filmstrip 12 is withdrawn from a film unit 14 and wound into a film roll 16 in a film roll chamber 18 in a frame 20 of a camera frame assembly 22. The camera frame assembly 22 is then completed. During this process, the free end 24 of the filmstrip 12 is positioned in the film roll chamber 18 and the camera frame assembly 22 is then transported. To prevent displacement of the free end 24 lodged in the chamber 18, the filmstrip 12 is anchored to the camera frame 20 during the transporting.

The frame 20 can be a one-piece plastic molding or can be an assemblage of multiple pieces. The camera frame assembly 22 is an assemblage of the frame 20 and other pieces. The term "camera frame assembly 22" is thus inclusive of, but not limited to, a completed, film-loaded camera. The timing of assembly of pieces of the camera frame assembly 22, except as specifically discussed here, can be adjusted to occur before or after other steps discussed within the limits of practical requirements.

The frame 20 has a midsection 26 that extends between a film return chamber 28 and the film roll chamber 18. The midsection 26 has surround 30 that bounds an exposure opening 32 through which light enters to expose the individual photoframes of the filmstrip 12 during use. The midsection 26 also has an extension 34 between the primary part 30 and the film roll chamber 18. A baffle 36 is joined to the midsection 26. The baffle 36 extends forward from the midsection 26 and, at the forward end, supports a lens unit 38 having one or more lens elements (not separately illustrated).

The midsection 26 has a pair of film guide surfaces 40 that extend along opposite sides of the exposure opening 32 and support the filmstrip 12 during use. The film guide surfaces 40 contact the filmstrip 12 during use and define a film path 42 that the filmstrip 12 occupies and is moved along during use. The film guide surfaces 40 can each be continuous between the film chambers 18,28 or can be interrupted one or more times.

Referring to FIGS. 7–9, 14, and 18–20, the midsection 26 has a pair of lateral fences 44 that extend rearward and adjoin the respective film guide surfaces 40. The fences 44 can each be interrupted or complete along the midsection 26. The fences 44 can be deleted, but are preferred, since the fences 44 can conveniently be used as part of a light lock around the film space 46.

The midsection 26 is shaped so as to meet the requirements of the lens unit 38 and to hold the filmstrip 12 in the film path 42. In the embodiments illustrated, the lens unit 38 requires a curved film plane, and the midsection 26 is shaped to provide that curve. The extension 34 of the midsection 26 can be straight or can be recurved (as in the frames 20 shown in FIGS. 18–22) to help hold the film 12 tightly in place during use.

The film unit 14 includes the filmstrip 12 and a holder 48. The type of holder 48 is not critical and can be a canister or patrone or a simpler structure such as the one disclosed in U.S. Pat. No. 6,190,061. The holder 48 includes a spool 50 and a shell 52 surrounding the spool 50.

The filmstrip 12 has a leading portion 54, followed in sequence by the main portion 10, and a trailing portion 56. The leading portion 54 has a free end 24. Opposite the free end 24, the trailing portion 56 has a retained end (not illustrated) held by the spool 50. In currently preferred embodiments, the leading portion 54, main portion 10, and trailing portion 56 are adjoining segments of a continuous and uniform filmstrip 12; however, the leading portion 54 can differ from and be adhered or otherwise attached to the main portion 10. Likewise for the trailing portion 56. For example, the leading portion can be a leader of opaque plastic or paper joined to the main portion by a tape or a layer of adhesive between overlapped segments of leading portion and main portion.

In a transverse direction, the filmstrip 12 has a central region 58 and a pair of opposed lateral edges 60. The central region 58 of the main portion 10 is used for exposure of images. The lateral edges 60 are not image-wise exposed.

Referring initially to FIGS. 1–7, as preliminary steps a camera frame assembly 22 is prepared and a film unit 14 is loaded into the film return chamber 28 of the frame 20 of the camera frame assembly 22. After the holder 48 of the film unit 14 has been placed in the camera frame assembly 22, a leading portion 54 of a filmstrip 12 is draped (62) across the midsection 26 of the frame 20 and the free end 24 of the filmstrip 12 is lodged (64) in the film roll chamber 18. This can be performed in two separate actions interrupted by a pause, as illustrated in FIG. 1, or the actions can be combined, without a pause.

The leading portion 54 of the filmstrip 12 protrudes from the holder 48. Any steps necessary to provide this protrusion are performed, at least by the time the leading portion 54 is draped (62). With some types of film units, such as Type 135 )"35 mm film"), this protrusion is provided at the time of manufacture. If not already provided, the leading portion 54 of the filmstrip 12 can be protruded from the holder 48 either before or after the holder 48 is placed in the film return chamber 28. It is preferred that the protrusion is provided before the holder 48 is loaded.

Figure 23:
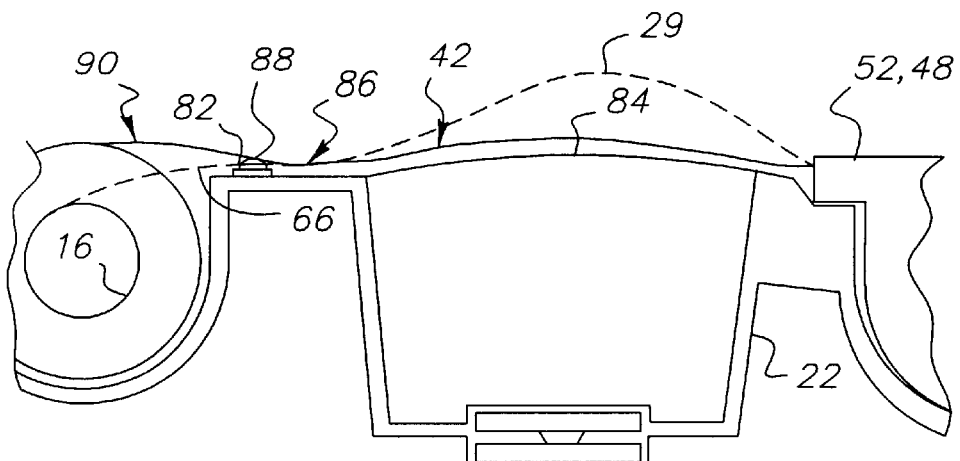
FIG. 23 is a semi-diagrammatical cross-section of the embodiments of FIG. 4 showing the relative position of the anchored leading portion (dashed line) drawn against the filmstrip (solid line) positioned in the film path after winding and installation of the rear cover (not shown).

Following the draping (62) of the leading portion 54, a retention zone 66 of the filmstrip 12, which adjoins the free end 24, is brought toward and anchored on (68) a retention structure 70 mounted to the frame 20, between the chambers 18,28. The retention structure 70 is mounted to the midsection 26 of the frame 20 and is matched to the retention zone 66 of the filmstrip 12. The retention structure 70 is recessed relative to the film path 42, in a direction toward the front of the camera (the bottom of the page in FIGS. 1–2b). When the retention zone 66 is brought against (68) the retention structure 70, the retention zone 66 is depressed forward (indicated by arrow 72), past the film path 42. (Best seen in FIGS. 23–25)

The camera frame assembly 22 is then transported (21). During the transporting, the engagement of the retention zone 66 and retention structure 70 is maintained (23). Referring to FIGS. 2a –2d, following the transporting (21), the retention zone 66 is pulled (25) off the retention structure 70 and the main portion 10 of the filmstrip 12 is wound (27) into the film roll 16 and the camera completed. These steps are discussed in greater detail below, in relation to specific embodiments.

The partially completed camera frame assembly 22 that is moved during the transporting step is also referred to herein as a transportable camera intermediate 31. In other words, the transportable camera intermediate 31 is a camera frame assembly 22 having a retention zone 66 registered on a corresponding retention structure 70. The retention zone 66 and retention structure 70 provide an adherence or holding function and are resistant to dislodging. A preferred retention zone 66 and retention structure 70 also provides an alignment function. For this reason, a layer of adhesive or the like and suitable adhering surface can be used for the retention zone 66 and retention structure 70, but are not preferred. Adhesive also presents a risk of inadvertent adherence in an incorrect position. A preferred retention zone 66 also has a uniform thickness that is the same as the thickness of the rest of the filmstrip 12 or is, in all areas, within 3–4 times the thickness of the rest of the filmstrip 12. A retention zone 66 of non-uniform or excessive thickness presents an increased risk that a film roll 16 formed of the filmstrip 12, as discussed below, will be non-uniform in shape. This can result in difficulty with film advance during camera use. For this reason, the use of a two part or non-flat fastener for the retention zone 66 and retention structure 70 are not preferred.

Referring again to FIGS. 1–3, following engagement of the retention zone 66 and retention structure 70, the leading portion 54 may protrude outward from the frame 20 in a bulge 29, when the retention zone 66 and retention structure 70 are in engagement. With some film units 14, the filmstrip 12 is freely movable into and out of the holder 48 and a protrusion of the leading portion 54 can be reduced, if desired, by pushing part of the filmstrip 12 back into the holder 48. This same result can be achieved with some other types of film units 14, such as Type 135, by rotation of the spool 50 in the appropriate direction. With these film units 14, rotation of the spool 50 can also be blocked, if desired, by arresting movement of the spool 50 in one or both directions with tooling or part of the camera frame assembly 22.

The figures illustrate preferred embodiments in which the retention zone 66 is a grip 67 and the retention structure 70 is a holdfast 71. The following discussion is predominantly limited to those preferred embodiments.

The grip 67 is an area of the filmstrip 12 bounding one or more perforations 72 and extending transversely across all or part of the width of the filmstrip 12. Each perforation 72 can take the form of a hole (an opening fully surrounded by filmstrip) or a notch (an opening at an edge of the filmstrip that is bounded on several sides). The grip 67 can have perforations 72 in the form of a combination of any numbers of holes and notches. (As a matter of convenience in general discussion herein, the grip 67 sometimes referred to as having a plurality of perforations 72.).

The grip 67 is sufficiently rigid and stiff to provide the functions later described. With a leading portion 54 that is made of the same material as the remainder of the filmstrip 12, the grip 67 can be a portion of the filmstrip 12 that is continuous with the rest of the filmstrip 12 and unreinforced. The leading portion 54 can also be unreinforced if made of a stiffer and tougher material than the filmstrip 12. With a leading portion of a less stiff material, such as paper (not shown), it is preferred that a suitable reinforcement be provided by the use of one or more additional adhered layers. For example, a segment of filmstrip can be adhered to paper to provide the grip.

The holdfast 71 is mounted to the midsection 26 and has one or more subunits 74. Each subunit 74 is in the form of a tab or post or other protuberance that has a shape matched to a corresponding perforation 72 of the grip 67. The subunits 74 and perforations 72 are configured and positioned so as fit together. Except in non-preferred embodiments, the subunits 74 and perforations 72 fit together in only a single orientation, so that fitting the subunits 74 and perforations 72 together registers the grip 67 on the holdfast 71.

The holdfast 71 extends outward toward, but not into, the film path 42 defined by the film guide surfaces 40. The subunit or subunits 74 of the holdfast 71 are fixed in place on the frame 20, that is the position of the subunit or subunits 74 of the holdfast 71 on the frame 20 are unchangeable relative to the frame 20, unless sufficient force is applied to cause damage to one or both. (As used herein, an item that is "fixed" relative to a particular structure is retained stationary relative to that structure.) The subunit or subunits 74 of the holdfast 71 can bend somewhat, but this is not beneficial. It is currently preferred that the subunit or subunits 74 be sufficiently stiff to not flex during use.

When the grip 67 is brought (68) toward the holdfast 71, the grip 67 registers on the holdfast 71. The grip 67 is then locked, by the holdfast 71 against longitudinal travel toward the film roll chamber 18 and against rotation about the holdfast 71. As a result, the leading portion 54 of the filmstrip 12 is held at both the holder 48 and the holdfast 71 and cannot move longitudinally toward the film roll chamber 18, and also cannot rotate. This stabilizes the free end 24 within a predefined location in the film roll chamber.

The locking of grip 67 and holdfast 71 is provided by aligned surfaces 76,78 of the grip 67 and holdfast 71. The aligned surfaces 76,78 mesh or closely adjoin when the grip 67 is in registry on the holdfast 71. The grip 67 can be held in place by gravity and be merely blocked from longitudinal and rotational movement by the holdfast 71, but it is preferred that the grip 67 is held tightly by at least one pair of opposed holdfast surfaces 78. The grip 67 can be flexed slightly while so held to internally bias the grip 67 against the holdfast surfaces 78. Such flexing can be allowed to vary in extent to provide a tolerance for the fit of the holdfast 71 and the grip 67.

Figure 17:
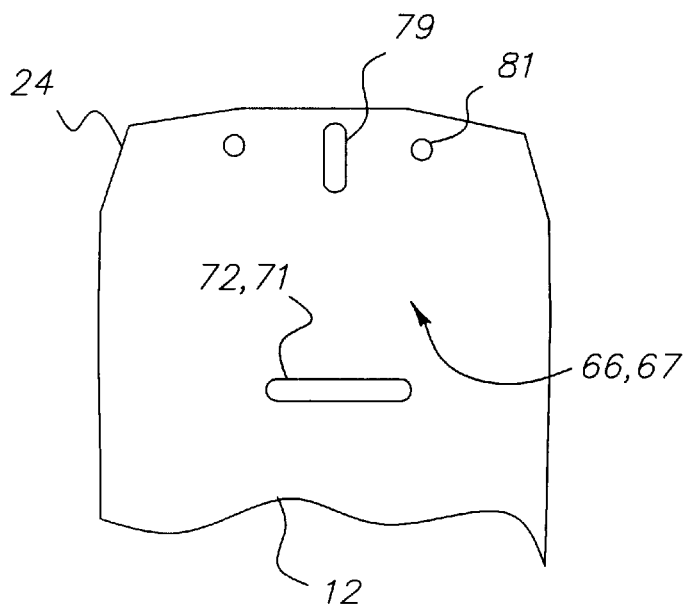
FIG. 17 is the same view as in FIG. 6 of the leading portion of the filmstrip of the camera frame assembly of FIG. 15.
Figure 18:
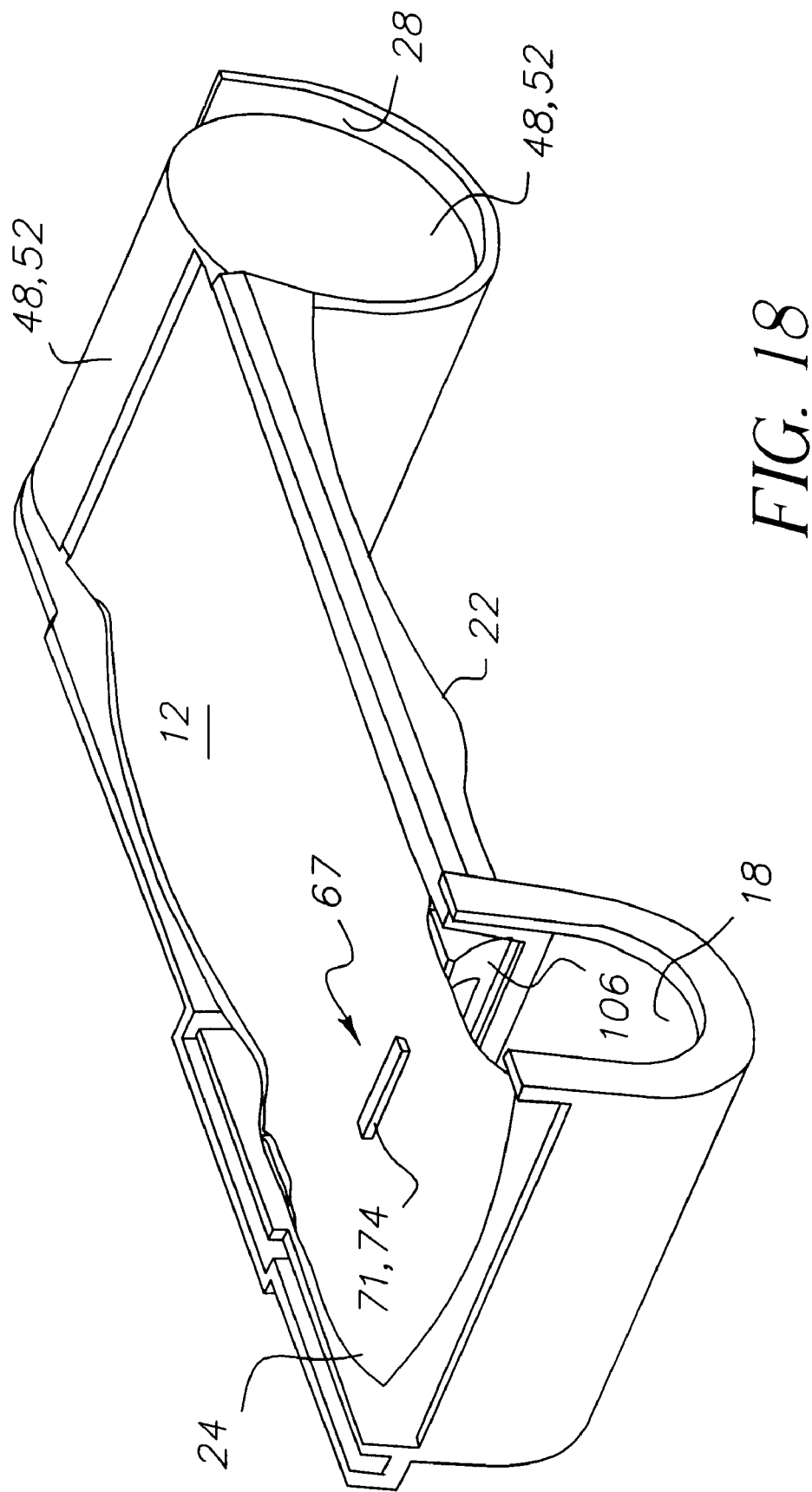
FIG. 18 is a left rear perspective view of another embodiment of the camera frame assembly. The camera frame assembly is shown after closure of the back opening, but the rear cover is deleted so that the filmstrip can be readily seen. The filmstrip occupies the film path from the film return chamber to near the holdfast. (Some features forward of the frame, including the baffle, are deleted for clarity in the same manner as in earlier perspective views.)

As the figures show, the grip 67 and holdfast 71 can have a variety of configurations, subject to the proviso that, for use together, a grip 67 and holdfast 71 need to have respective contact surfaces 76,78 dimensioned so as to match each other. In some cases, the grip 67 can be modified to provide contact surfaces 76 that match the contact surfaces 78 of more than one different holdfast 71. For example, the grips 67 shown in FIGS. 6 and 17 could both be combined on a single filmstrip 12 (not illustrated).

The grips 66 and holdfasts 71 of the different embodiments have different advantages and disadvantages. All of the holdfasts 71 are recessed relative to the film guide surfaces 40 to help protect the central region 58 of the filmstrip 12 from contacting the holdfast 71 and possibly being scratched or abraded. Grips 66 that are laterally aligned with the film guide surfaces 40 and, thus, laterally spaced away from the exposure opening 32 and the central region 58, have an even lesser risk of contact with the central region 58 and resulting damage to exposed images. On the other hand, it is slightly easier to register a grip 67 on a holdfast 71 having a single, central subunit 74 than on a holdfast 71 having multiple, laterally positioned subunits 74.

Figure 10:
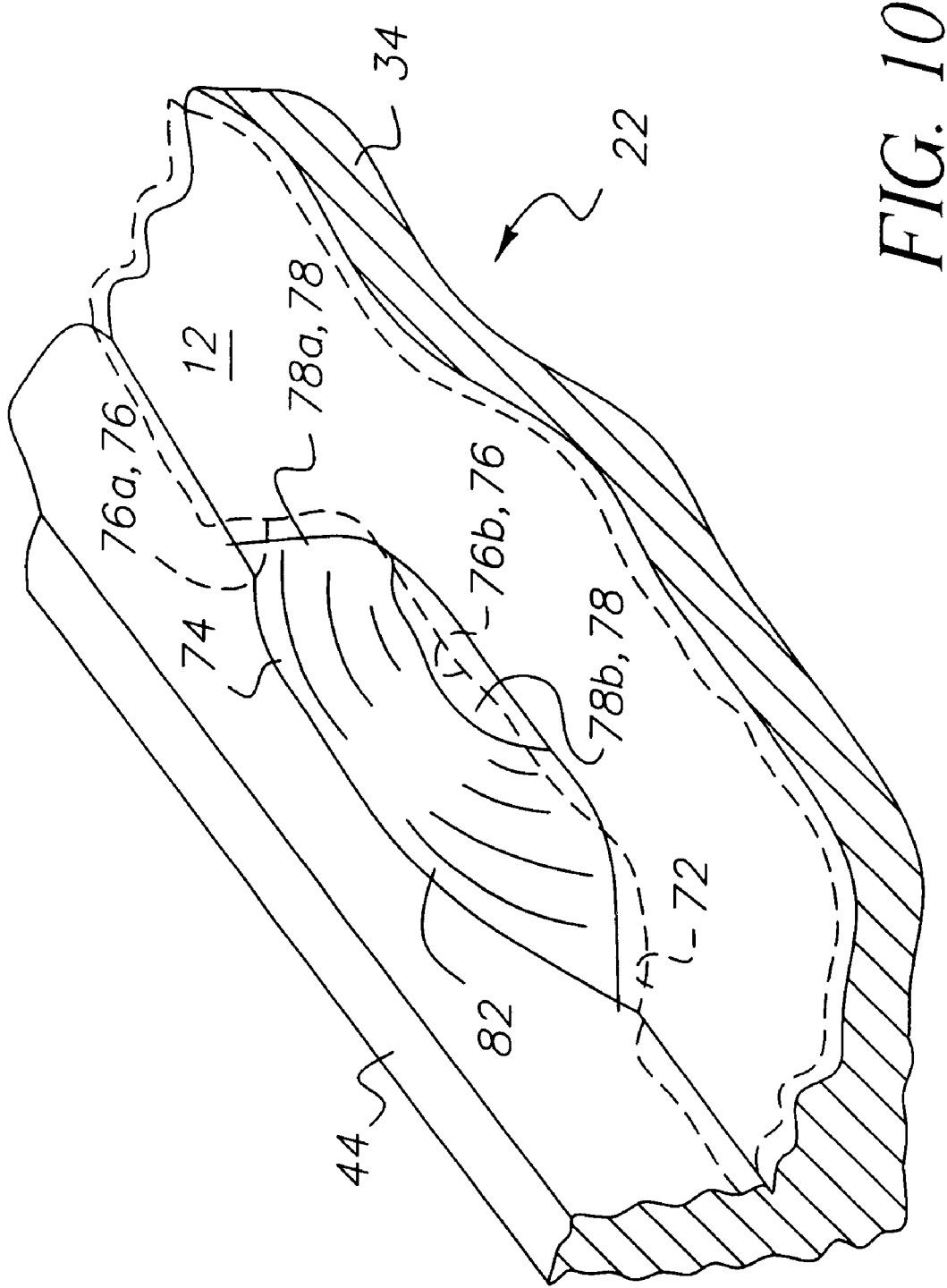
FIG. 10 is an enlarged rear perspective view of another embodiment of the frame having a modified grip. One subunit of the grip is shown.
Figure 11:
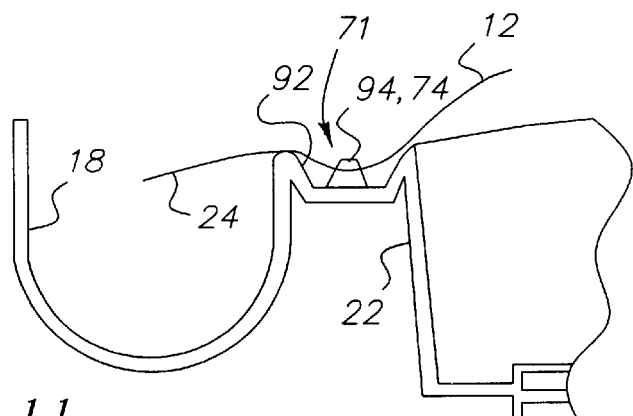
FIG. 11 is the same view as in FIG. 4 for still another embodiment of the camera frame assembly.
Figure 12:
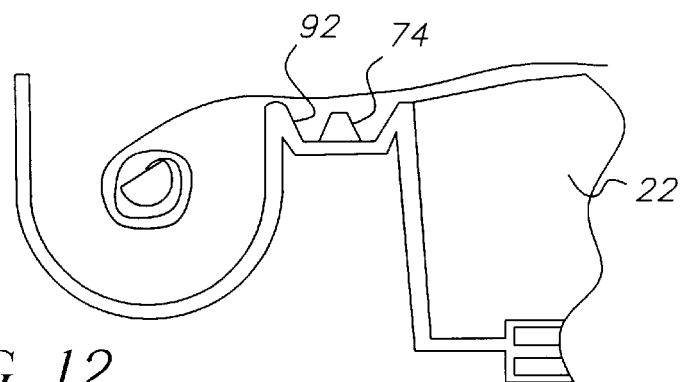
FIG. 12 is the same view as in FIG. 5 of the camera frame assembly of FIG. 11.
Figure 13:
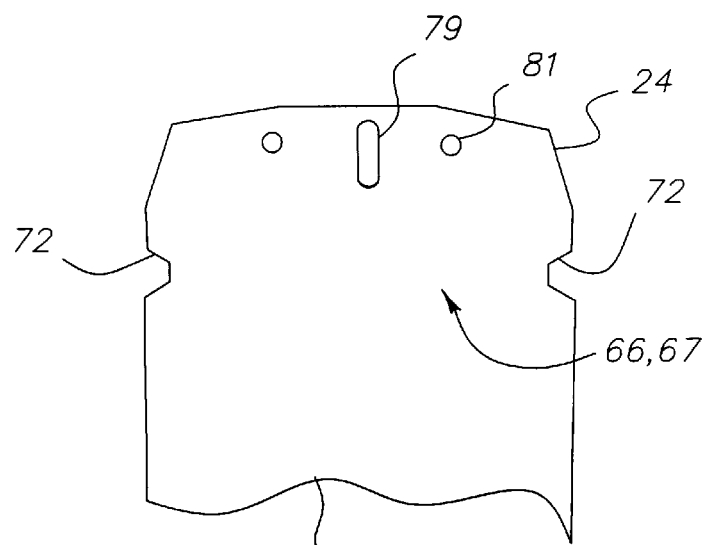
FIG. 13 is the same view as in FIG. 6 of the leading portion of the filmstrip of the camera frame assembly of FIG. 11.

Referring now to embodiments shown in FIGS. 4–10, and 26, the holdfasts 71 each have a pair of spaced apart subunits 74. Each subunit 74 is laterally aligned with a respective one of the film guide surfaces 40. Each subunit 74 adjoins and, preferably, is continuous with a respective fence 44. Each subunit 74 has a pair of cross-travel surfaces 78*a* and a travel surface 78*b* extending between the cross-travel surfaces 78*a*. In the embodiment of FIGS. 4–9, the cross-travel surfaces 78*a* of each subunit 74 are each angled, in a plane parallel to the exposure opening 32, in directions that are inward and toward each other, so as to define imaginary lines that intersect over the midsection 26. In the embodiment of FIG. 10, the cross-travel surfaces 78*a* are inwardly curved rather than angled.

In the embodiments of FIGS. 4–10, the travel surface 78*b* is substantially flat and parallel to the direction of film travel from chamber to chamber, in the completed camera and substantially perpendicular to a plane defined by the exposure opening 32. The corners where cross-travel and travel surfaces 78*a*,78*b* meet, are relieved by being beveled or rounded-off. This relief makes registration easier.

The grip 67 of the corresponding filmstrip 12 has perforations 72 in the form of notches matching the shape of respective travel and cross-travel surfaces 78*a*,78*b*. In this and other embodiments shown, the filmstrip 12 also has a slot 79 and two holes 81 ,which are provided to allow attachment of the filmstrip 12 to a spool in some type of camera (not shown) or a mandrel in some types of film winding equipment (also not shown). For the purposes of this application, the slot 79 and holes 81 are inconsequential and are not included within the term "perforations" in the illustrated embodiments.

When the grip 67 is registered on the holdfast 71, the travel surfaces 78*b* tightly engage corresponding first surfaces 76*b* of the grip 67 and the cross-travel surfaces 78*a* loosely adjoin corresponding second surfaces 76*a* of the grip 67. The cross-travel and second surfaces 78*a*,76*a* can be modified to tightly engage, if desired.

In the embodiments of FIGS. 4–10, rearward (toward the back opening 80 of the camera frame 20) from the travel surface 78*b* and cross-travel surface 78*a* of each subunit 74 is a cap 82. The caps 82 are each part of one of the two film guide surfaces 40. Referring now to FIGS. 7–9 and 23, the surround 30 extends around all four sides of the exposure opening 32. The film guide surfaces 40 each have a first section 84 that begins at the film return chamber 28 and extends longitudinally along most of the longitudinal dimension of the exposure opening 32. The first sections 84 are each followed by a gap 86 (best seen in FIG. 23) where the film path 42 departs from the surround. The gaps 86 are each followed by a second section 88 that is the outer surface of the respective cap 82 (shown in FIG. 26). This is followed by another gap 90 where the film path 42 continues to the location of the completed film roll 16. The holdfast 71 is recessed, relative to the film path 42, below the caps 82.

Figure 14:
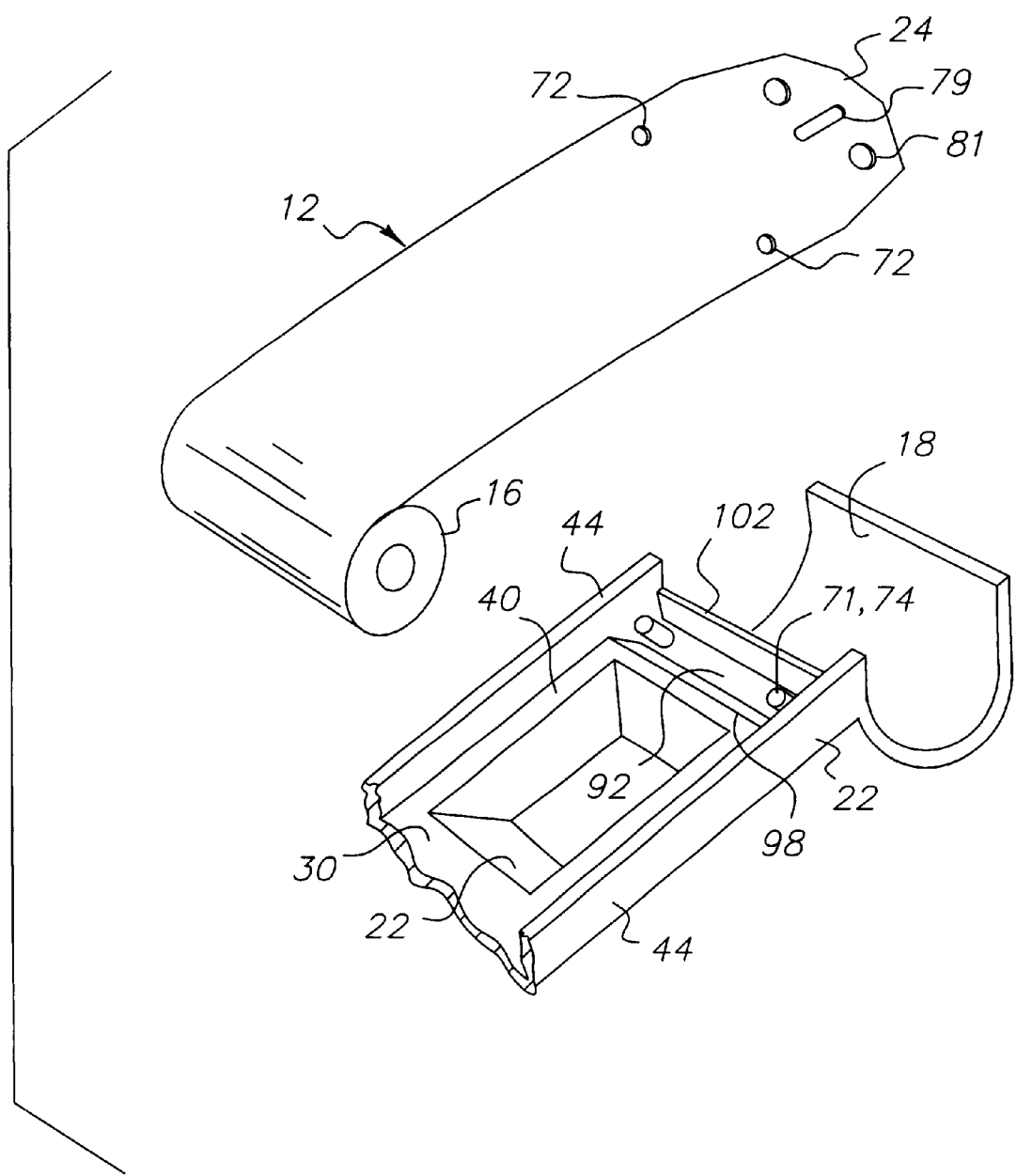
FIG. 14 is a partial, exploded, perspective view of a modification of the camera frame assembly of FIG. 11. The film return chamber is not shown.
Figure 15:
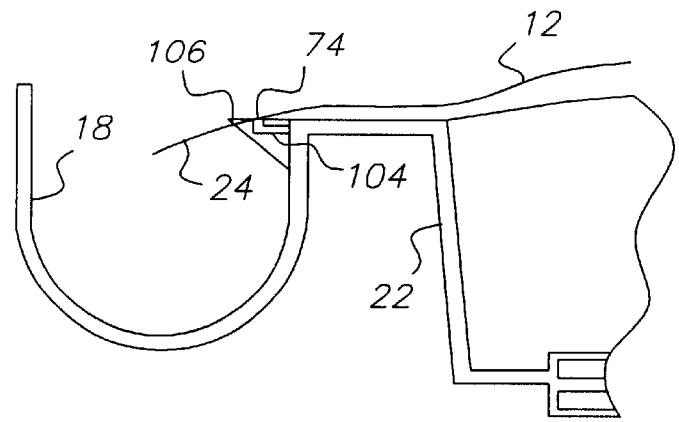
FIG. 15 is the same view as in FIG. 4 for still another embodiment of the camera frame assembly.
Figure 16:
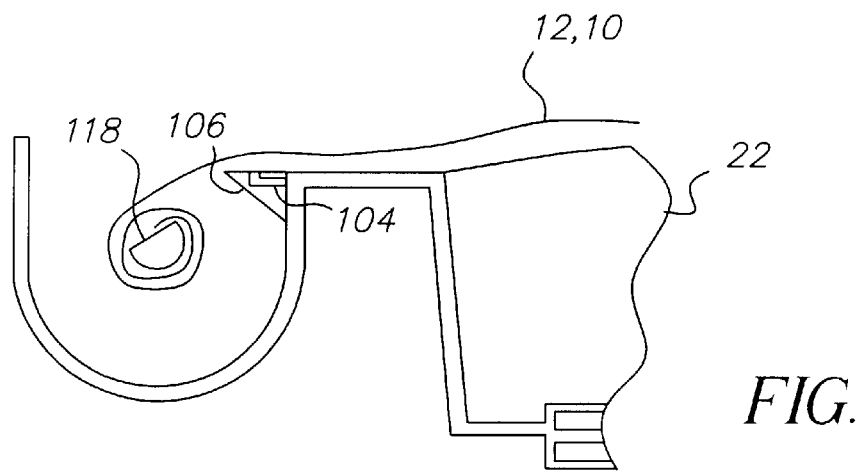
FIG. 16 is the same view as in FIG. 5 of the camera frame assembly of FIG. 15.

Referring to FIGS. 11–14, and 27, the holdfast 71 has a pair of spaced apart subunits 74. Each subunit 74 is laterally aligned with one of the film guide surfaces 40. In this case, the extension 34 of the midsection 26 has a recess 92, in the form of a trough that extends transversely across the midsection 26. The two subunits 74 of the holdfast 71 are joined to the frame 20 at the bottom of the recess 92 and extend outward, that is, rearward toward the back opening 80. Each of these subunits 74 is shaped like a truncated cone. The grip 67 of the corresponding filmstrip 12 has a pair of circular perforations 72 located in positions corresponding to the locations of the subunits 74. The size of the cone-shaped subunits 74 is limited by available space in the recess 92, taking into account the space needed to allow deflection of the grip 67 into the recess, without kinking. The apex 94 of each cone 74 is flat, but that shape is unimportant, since the apex 92 is spaced from the film path 42 and, at most, only incidentally touches the filmstrip 12 during registry. The angle of the cone 74 can be reduced so as to change each subunit 74 from a conical shape into a cylindrical shape, as shown in FIG. 14 or, alternatively, can be adjusted to increase the cone angle so as to limit the extent of deflection of the grip 67 into the recess 92 when the grip 67 is registered on the holdfast 71.

Figure 24:
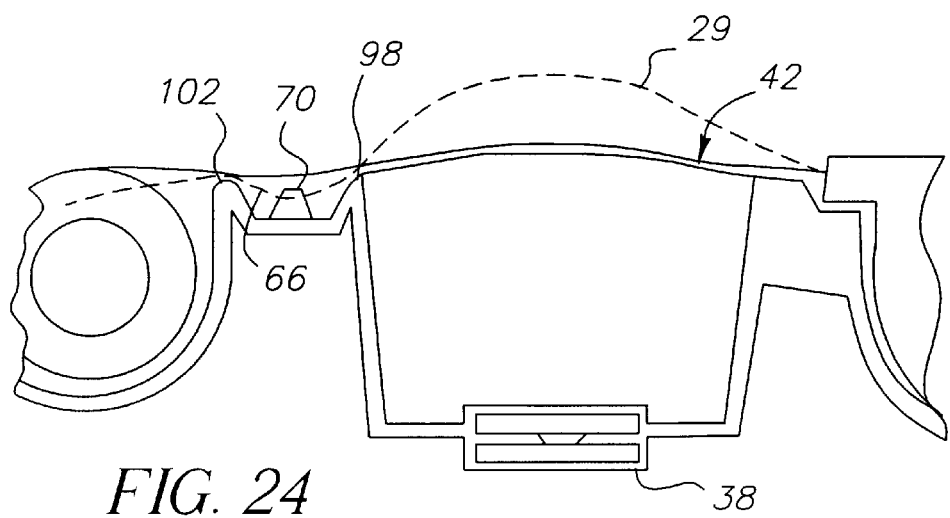
FIG. 24 is the same view as FIG. 23 but for the embodiment of FIG. 11.

Referring to FIG. 24, in the embodiment of FIGS. 11–14, the guide surfaces 40 each have a first section 96 that follows the exposure opening surround 30 until interrupted at the inner wall 98 of the recess 92. In addition to this first section 96, the guide surfaces 40 each have a second section 100 formed by the outer wall 102 of the recess 92.

Referring to FIGS. 15–22, 25 and 28, in other embodiments, the holdfast 71 has a single subunit 74 in the form of a tab extending transversely part-way across the frame 20. The grip 67 has a single perforation 72 in the form of a slot matched to the tab shaped subunit 74. The subunit 74 has a pair of opposed transverse surfaces 78*c* and a pair of opposed end surfaces 78*d* extending between the transverse surfaces 78*c*. The shapes of the subunit surfaces 78 and matching grip surfaces 76 are simple. The transverse surfaces 76*c*,78*c* are flat. The end surfaces 76*d*,78*d* are curved. More complex shapes could be provided. The apex or upper surface 94 (facing the back opening) is flat. The subunit 74 is relieved between the upper surface 94 and the transverse and end surfaces 78*c*,78*d* by being beveled or rounded. The fit between the grip 67 and one or both pairs of opposed surfaces 78*c*,78*d* is, preferably, sufficiently tight so as to bind the grip 67.

Figure 19:
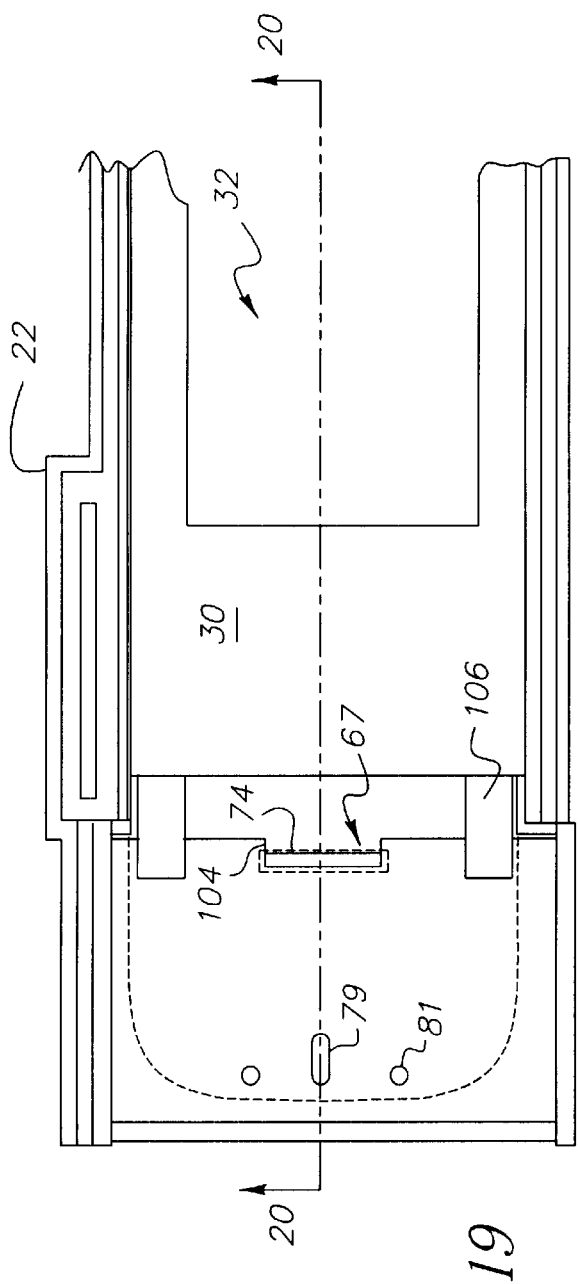
FIG. 19 is a rear view of the camera frame assembly of FIG. 18. The position occupied by the filmstrip is indicated by dashed lines.
Figure 20:
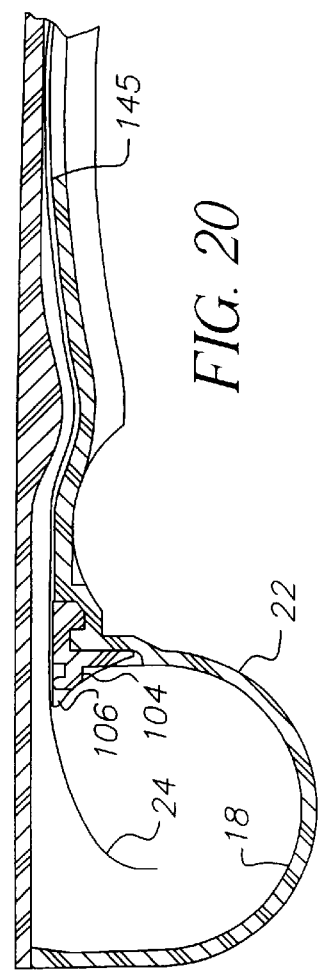
FIG. 20 is a cross-sectional view of the camera frame assembly of FIG. 18 taken substantially along line 20—20 of FIG. 19. A filmstrip is shown lodged in the film roll chamber.
Figure 25:
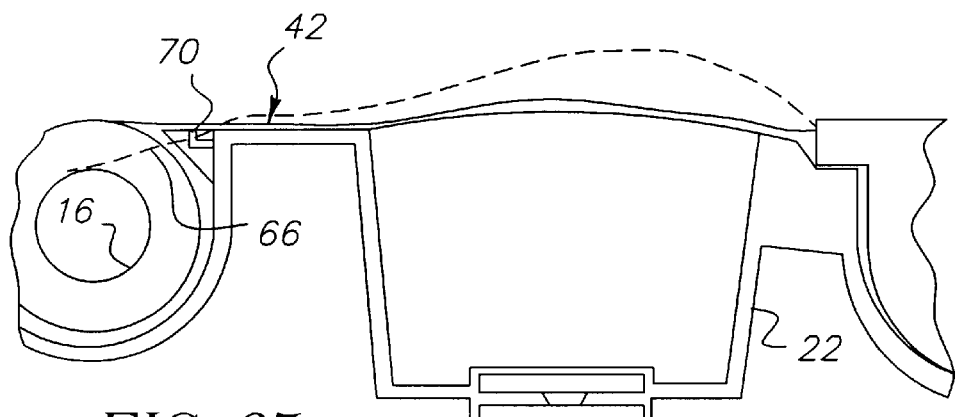
FIG. 25 is the same view as FIG. 23 but for the embodiment of FIG. 15.
Figure 26:
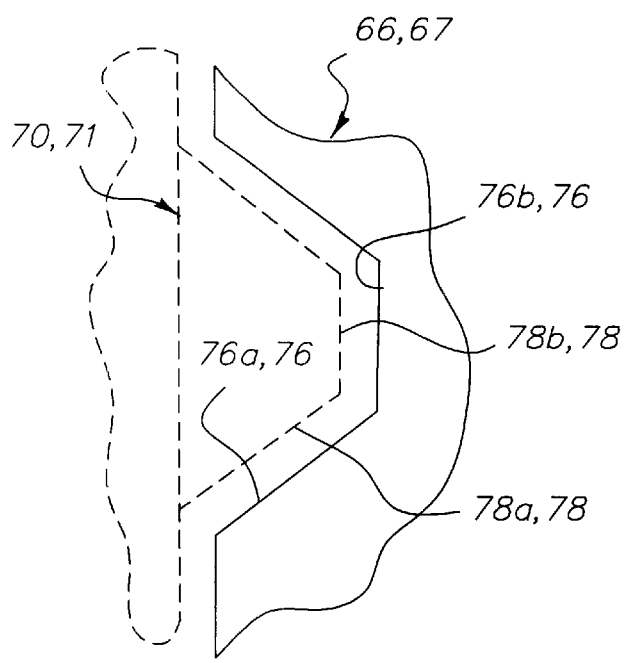
FIG. 26 is a partial enlargement of FIG. 6.
Figure 27:
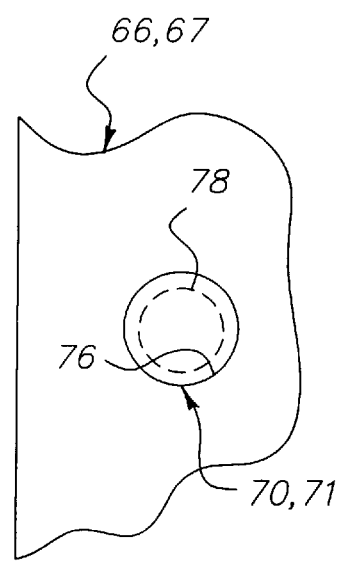
FIG. 27 is a partial enlargement of FIG. 13.
Figure 28:
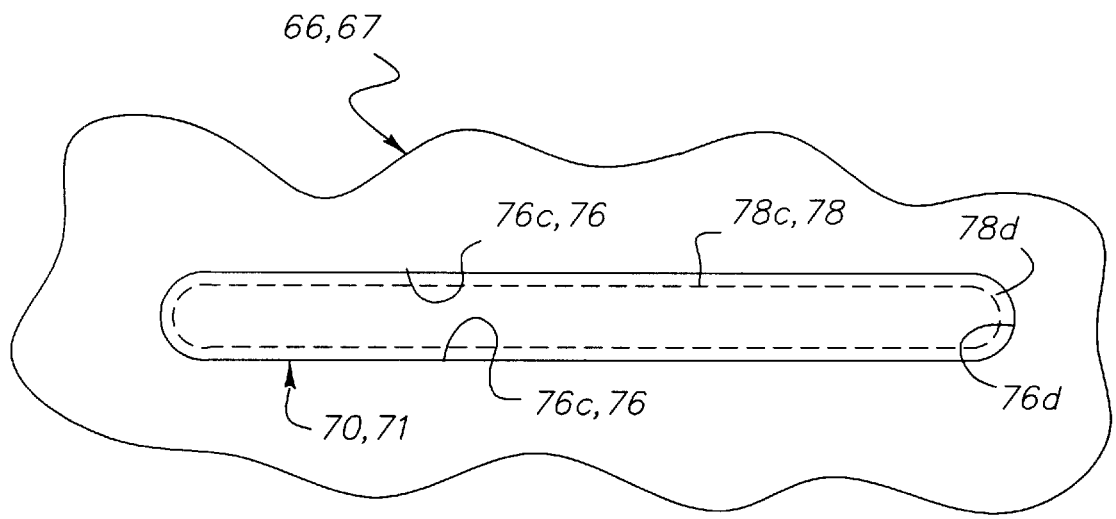
FIG. 28 is a partial enlargement of FIG. 17.

In the embodiment of FIGS. 15–20, the subunit 74 is joined to a flange 104 that overlies part of the film roll chamber 18 and is positioned between a pair of anti-clockspring wedges 106. The wedges 106 extend farther toward the back opening 80 than the holdfast 71; which, thus, occupies a recess 92 between the two wedges 106. The grip 67 is deflected into the recess 92 during registration. Spatial constraints on the flange 104 are comparable to those on the recess 92 of FIGS. 11–14. Referring to FIGS. 19–20 and 25, the guide surfaces 40 are each continuous from the film return chamber 28, along the surround 30, and along the respective wedges 106. The subunit 74 is laterally spaced from the guide surfaces 40 and recessed away from the film path 42.

Figure 21:
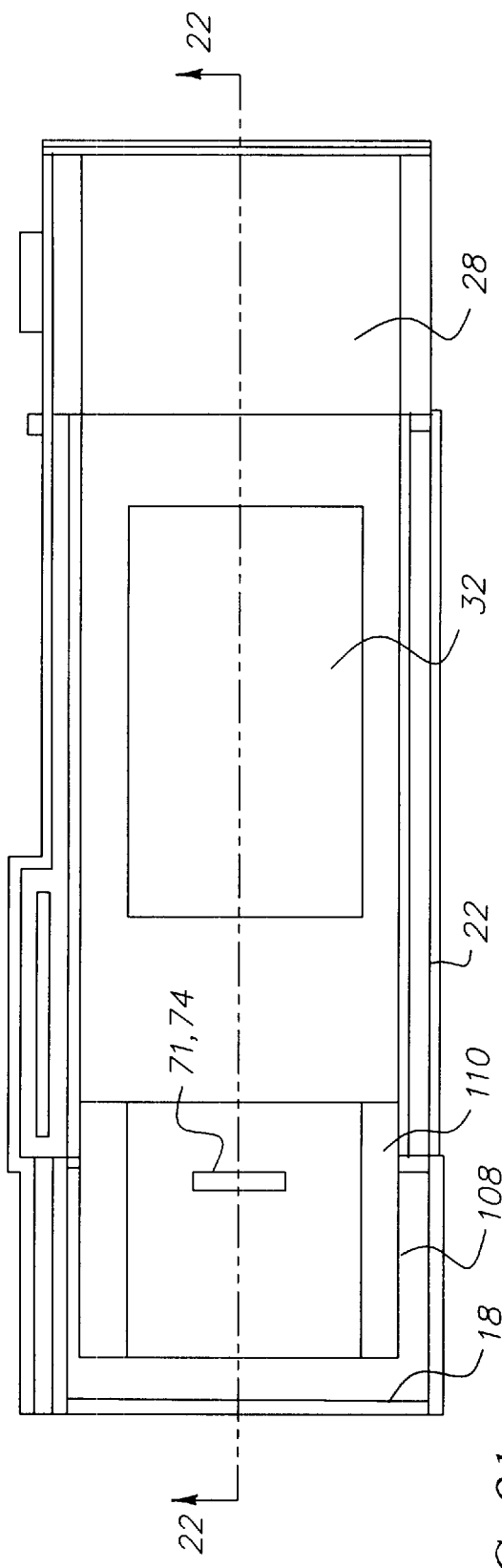
FIG. 21 is the same view as FIG. 19 of still another embodiment of the camera frame assembly. The filmstrip is not shown.
Figure 22:
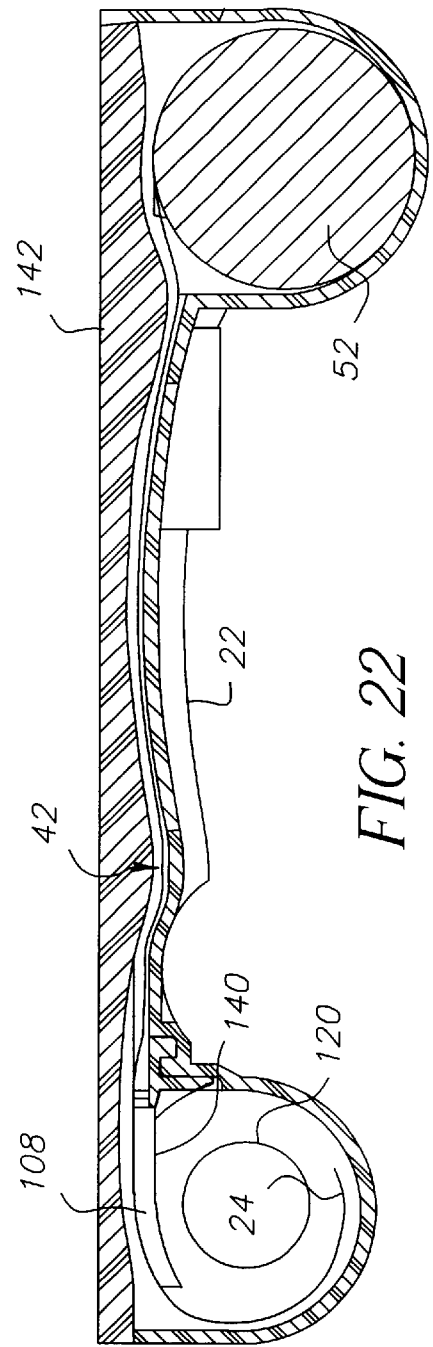
FIG. 22 is the same view as FIG. 20 of the camera frame assembly of FIG. 21.

FIGS. 21–22 illustrate a modification of the embodiment of FIGS. 15–20 in which a shield 108 extends longitudinally over the film roll chamber 18 from the midsection 26 to a position short of the outer wall 102 of the film roll chamber 18. The shield 108 has a pair of opposed lateral portions 110 that form part of the guide surfaces 40, in the same manner as the rear-facing surfaces of the wedges 106, previously discussed. Between the lateral portions 110 is a central portion 112 that is recessed. The tab shaped subunit 74 is joined to the central portion 112 and is also recessed forward relative to the lateral portions 110, so as to avoid contact with the filmstrip 12, in the same manner as in the embodiment of FIGS. 15–20.

As shown in FIG. 22, the shield 108 changes the position of the free end 24 of the filmstrip 12 in the film roll chamber 18, relative to the embodiment of FIGS. 15–20. The length of the leading portion 54 lodged in the film roll chamber 18 is also longer.

After the grip 67 and holdfast 71 are brought (68) into engagement, the camera frame assembly 22 is transported (21) (indicated in FIG. 1 by dashed lines). During the transporting (21), the grip 67 and holdfast 71 remain engaged and the holdfast 71 blocks rotation and longitudinal travel. The term "transporting" is used in an ordinary sense of moving the camera frame assembly 22 from place to place. "Transporting" can be limited to movement in a single plane, within a restraining pallet or nest, along a conveyor or other transport device; but is preferably inclusive of movement in multiple planes, with or without a pallet or nest or other restraint.

Figure 2A:
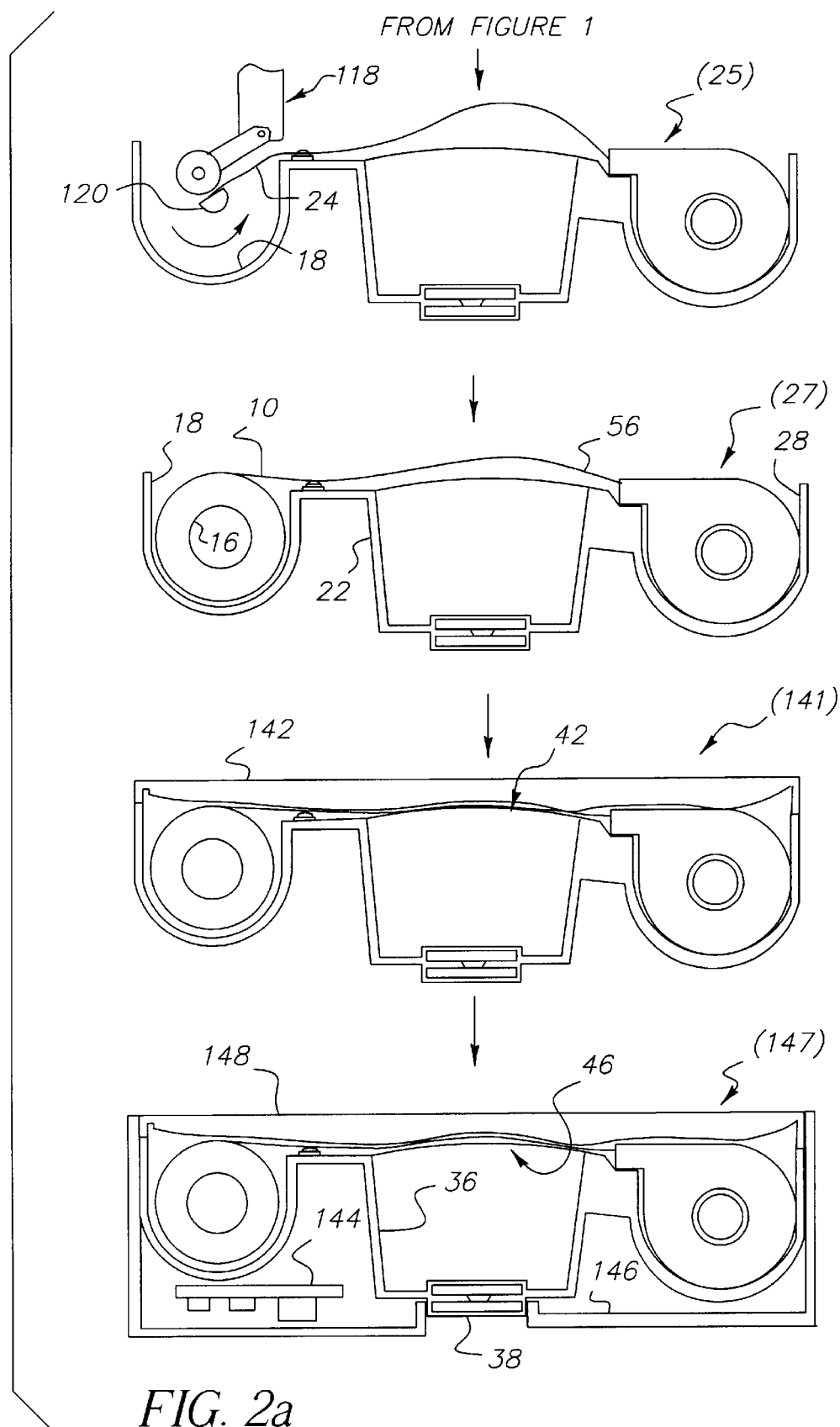
FIG. 2a is a diagrammatical view of the final steps of the method of FIG. 1.
Figure 2B:
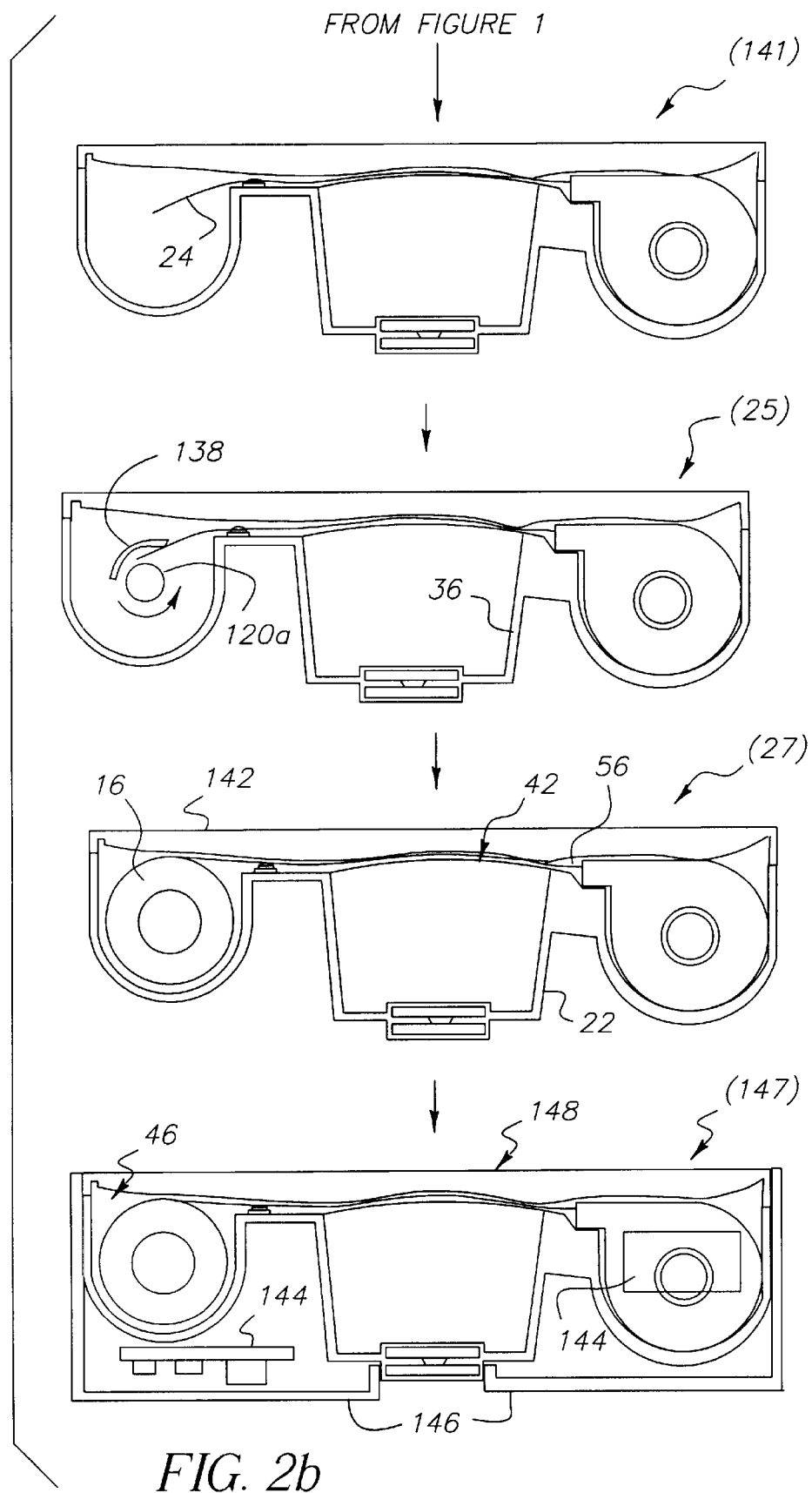

Referring now to FIGS. 2a and 2b, during and following the transporting (21), the free end 24 of the leading portion 54 of the filmstrip 12 remains lodged in the film roll chamber 18. While so lodged within the film roll chamber 18, the free end 24 is grabbed by a film winding device 118. The free end 24 is preferably lodged within the film roll chamber 18 continuously, beginning at a placement step contemporaneous with or just succeeding the draping of the leading portion 54 across the midsection 26 of the frame 20. Alternatively, the free end 24 can be placed in the film roll chamber 18 immediately before being grabbed or can be placed in the film roll chamber 18 earlier and then be intermittently removed prior to being replaced and then grabbed by the film winding device 118. In any case, the engagement of the grip 67 and holdfast 71 remains continuous until the free end 24 is grabbed.

When the free end 24 is grabbed by the winding device 118, the filmstrip 12 is tugged, pulling (25) the grip 67 off the holdfast 71. The rest of the leading portion 54 and the main portion 10 of the filmstrip 12 are then wound by the winding device 118, within the film roll chamber 18, about the free end 24 so as to form the film roll 16.

Figure 2C:
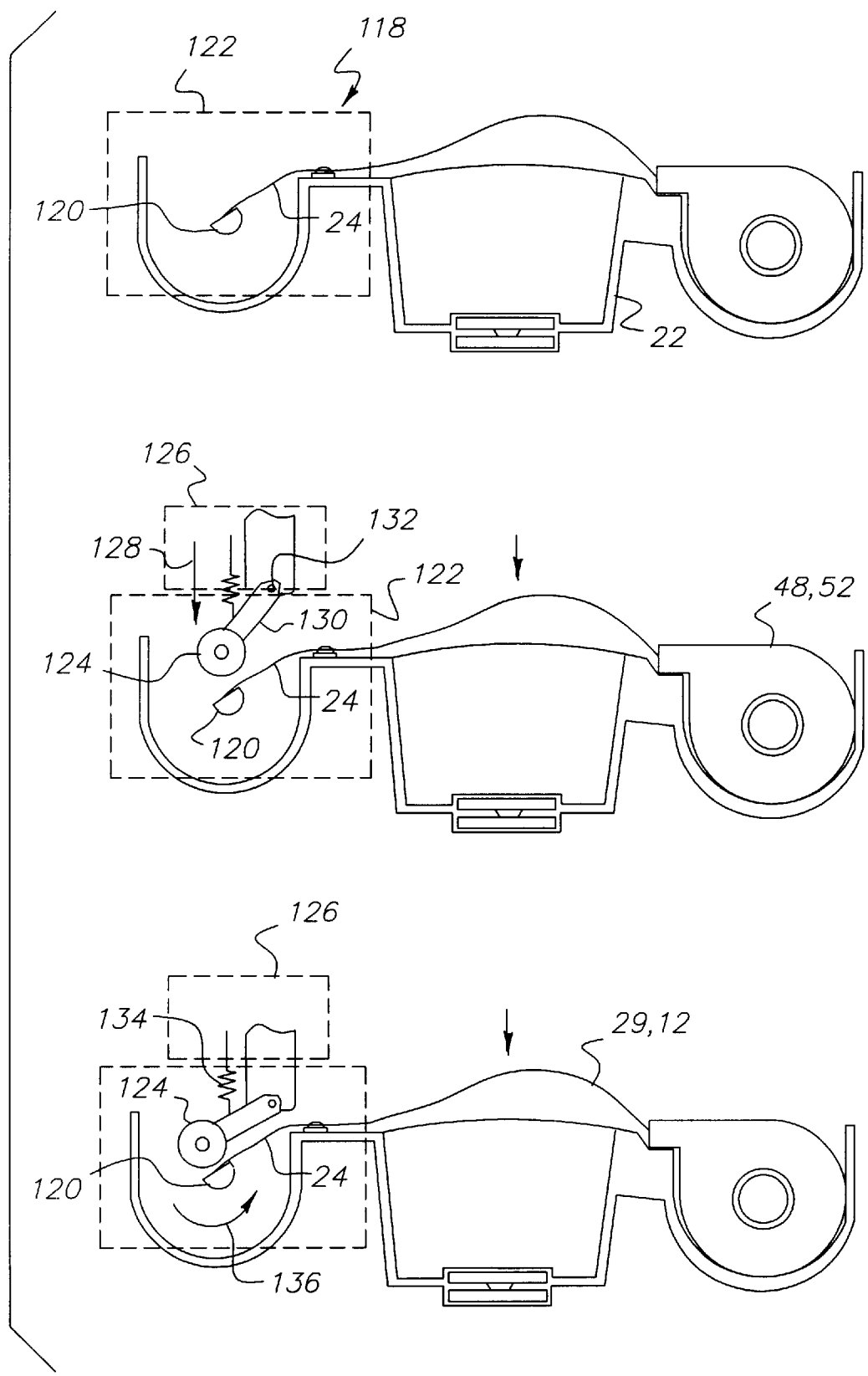

The grabbing of the free end 24 of the filmstrip 12 by the winding device 118 of FIG. 2a is shown in FIG. 2c. A mandrel 120 of the winding device 118 is moved axially (in a direction perpendicular out of the plane of the figure) into the film roll chamber 18 by a first actuator (indicated by dashed line 122). A rotary guide 124 is then lowered toward the mandrel 120 by a second actuator (indicated by dashed line 126) in the direction indicated by arrow 128. The rotary guide 124 is pivotable on an arm 130 about a pivot arm axis 132 and is biased by a spring 134 toward the mandrel 120. The free end 24 is trapped between the rotary guide 124 and the mandrel 120 when they come together. The mandrel 120 is then rotated, in the direction of arrow 136 to wind the filmstrip 12. The mandrel 120 can have openings (not shown) to which a vacuum source is applied to help bring the free end 24 into place. If desired, the mandrel 120 and rotary guide 124 can also be moved, within the film roll chamber 18, during the grabbing step in directions parallel to the plane of the figure.

Figure 2D:
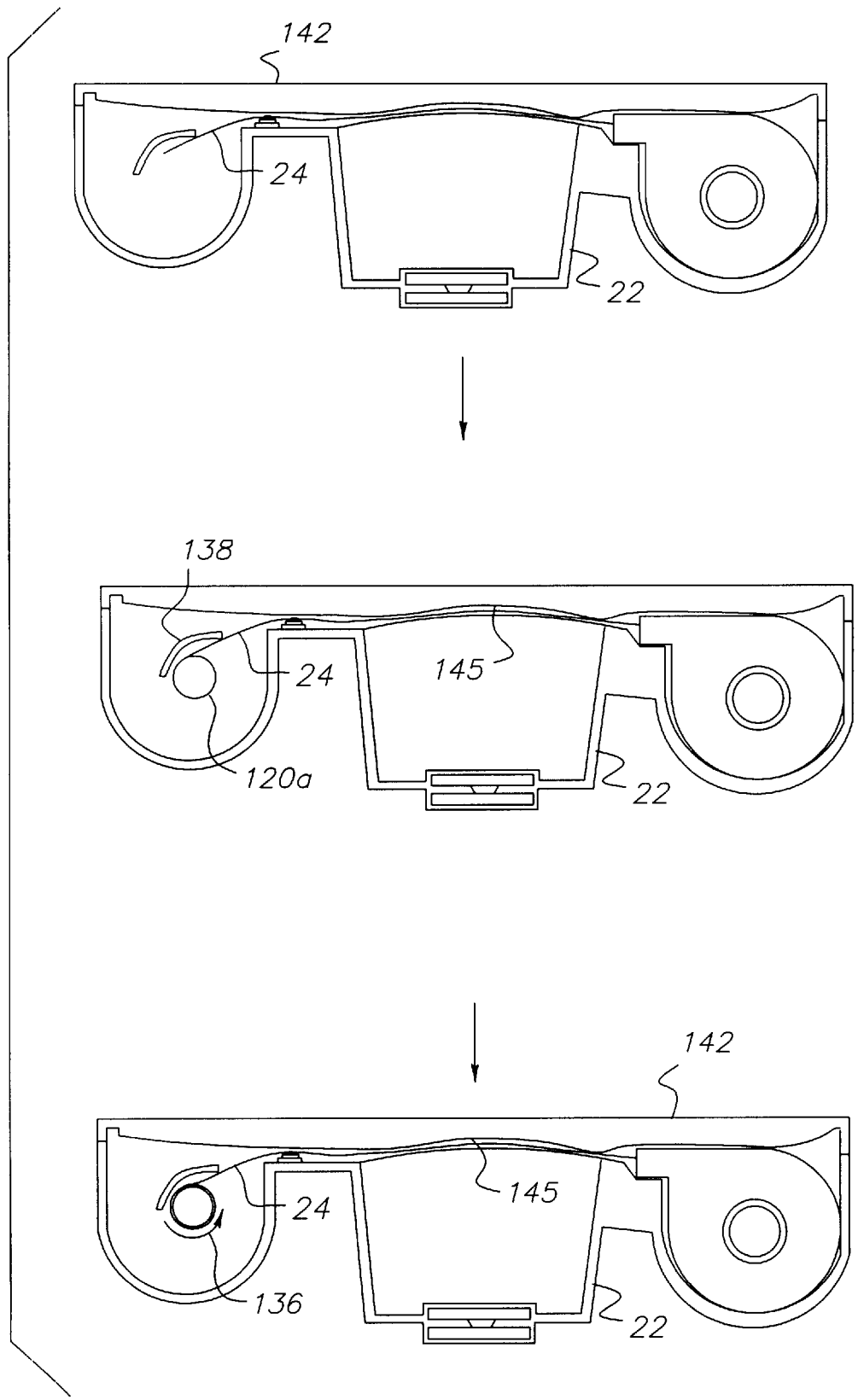
FIG. 2d is a diagrammatical view illustrating the grabbing step of the method of FIG. 2b.

The grabbing of the free end 24 of the filmstrip 12 by the winding device 118 of FIG. 2b is shown in FIG. 2d. A c-shaped guide 138 is moved into the film roll chamber 18 in a direction parallel to the axis of the spool 50 and the axis of the completed film roll 16. The guide 138 is disposed over the free end 24. A vacuum mandrel 120a is then extended in axially, trapping the free end 24 between the guide 138 and the mandrel 120a. As in the earlier example, the mandrel 120a and guide 138 can also be moved, within the film roll chamber 18, relative to the chamber 18 and each other so as to ensure trapping of the free end 24. The embodiment shown in FIG. 22 can use a similar winding device 118, but the c-shaped guide 138 is replaced by the inner surface 140 of the shield 108.

After film winding, the winding device 118 is removed and the back opening 80 formed by the film chambers 18,28 and midsection 26 is closed (141) by joining a rear cover 142 onto the camera frame assembly 22. The rear cover 142 includes a platen 145 that is shaped so as to compact the filmstrip 12 into the film path 42 defined by film guide surfaces 40 of the frame 20. Other camera components 144, and a front cover 146 are attached, completing (147) the camera 148. The completed camera provides a light-tight film space 46. The main portion 10 of the filmstrip 12 is protected from actinic light, as necessary, prior to completion by performing one or more of the steps in a dark enclosure (not shown).

The rear cover 142 can be attached before or after film winding, depending upon the access to the film roll chamber 18 required by the winding device 118. The winding device 118 of FIG. 2a requires both rear access through the back opening 80 and end access through a cut-away portion of the frame 20. The attachment of the rear cover 142 follows winding. The winding device 118 of FIG. 2b requires only end access. The rear cover 142 is attached prior to film winding.

Figure 3:
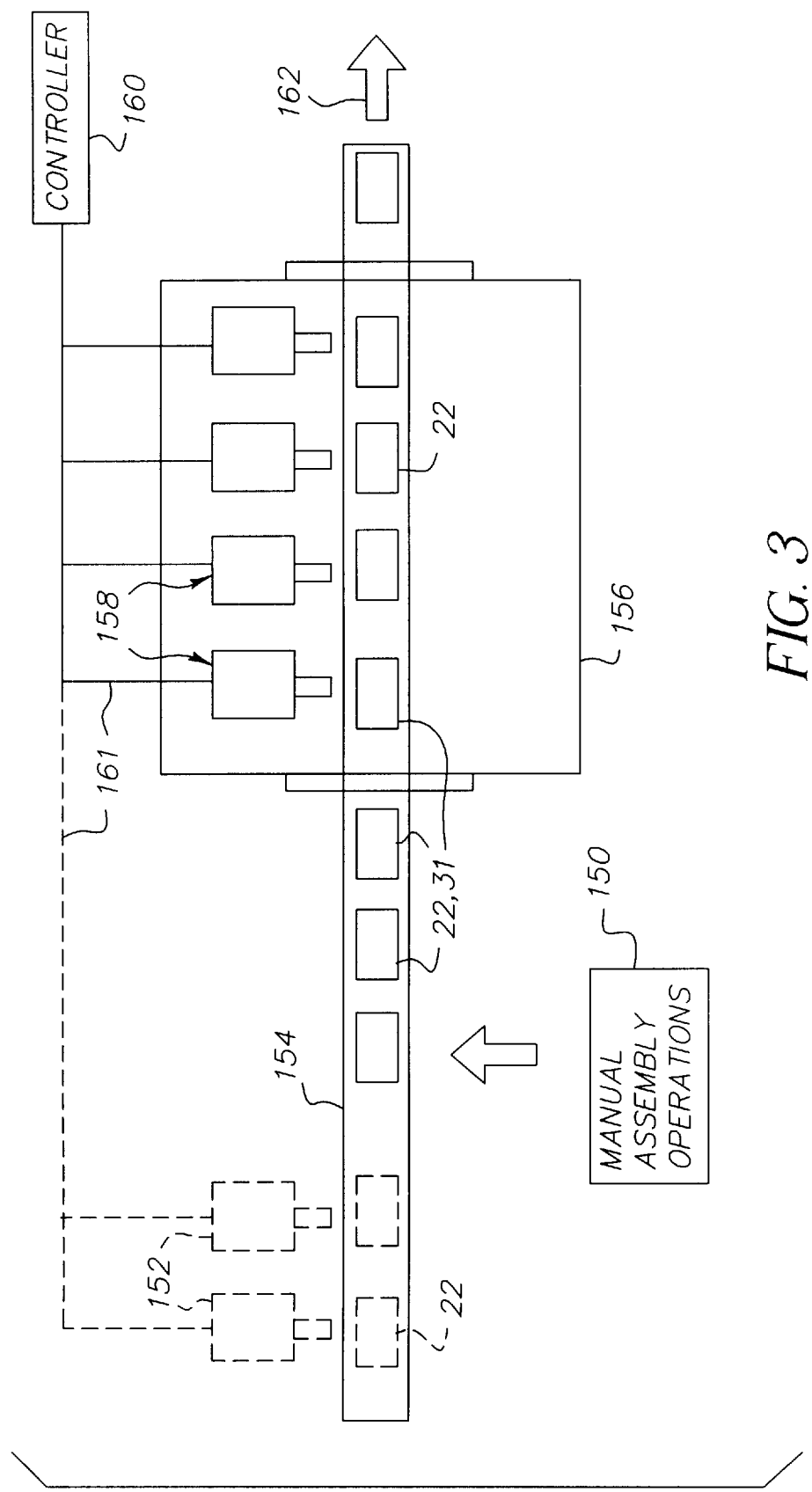
FIG. 3 is a diagrammatical view of an assembly system for the methods of FIGS. 1–2b.
Figure 4:
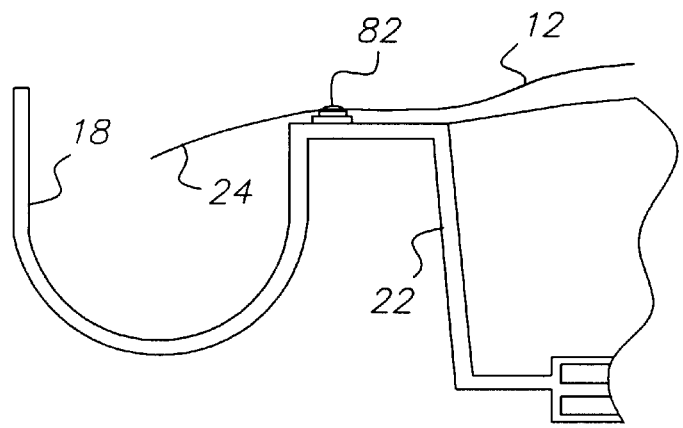
FIG. 4 is an enlarged view of the film roll chamber of the camera frame assembly shown in FIG. 1 after the anchoring step.
Figure 5:
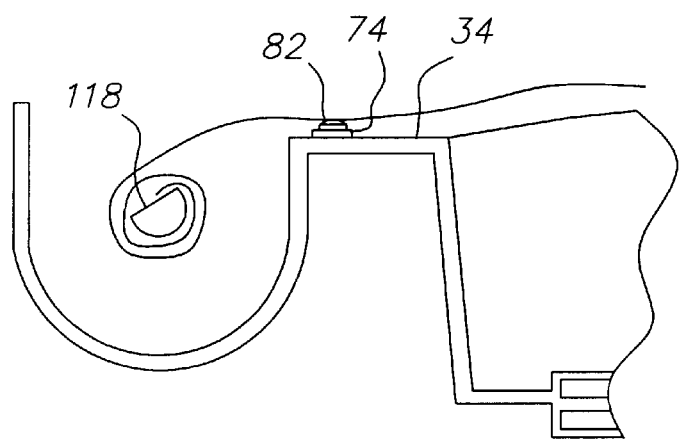
FIG. 5 is the same view as FIG. 4 after the start of film winding.
Figure 6:
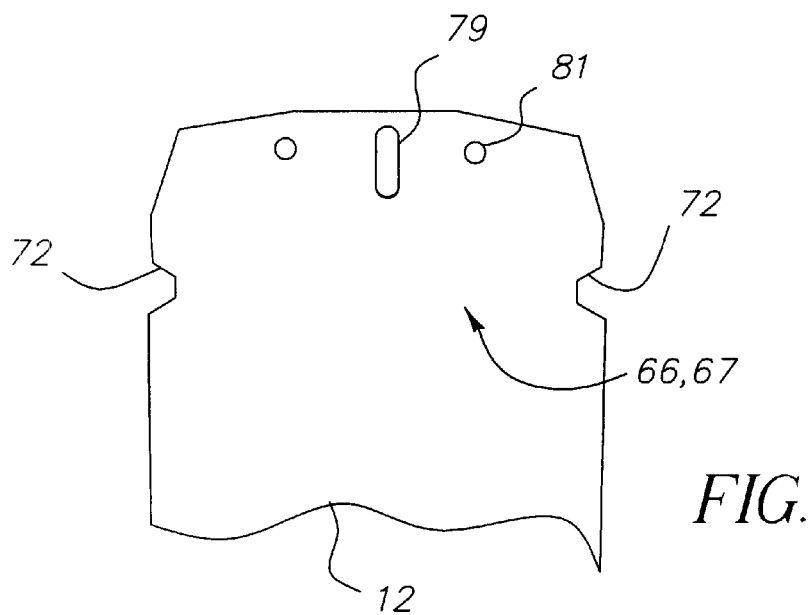
FIG. 6 is a top plan view of the leading portion of the filmstrip of FIG. 1.
Figure 7:
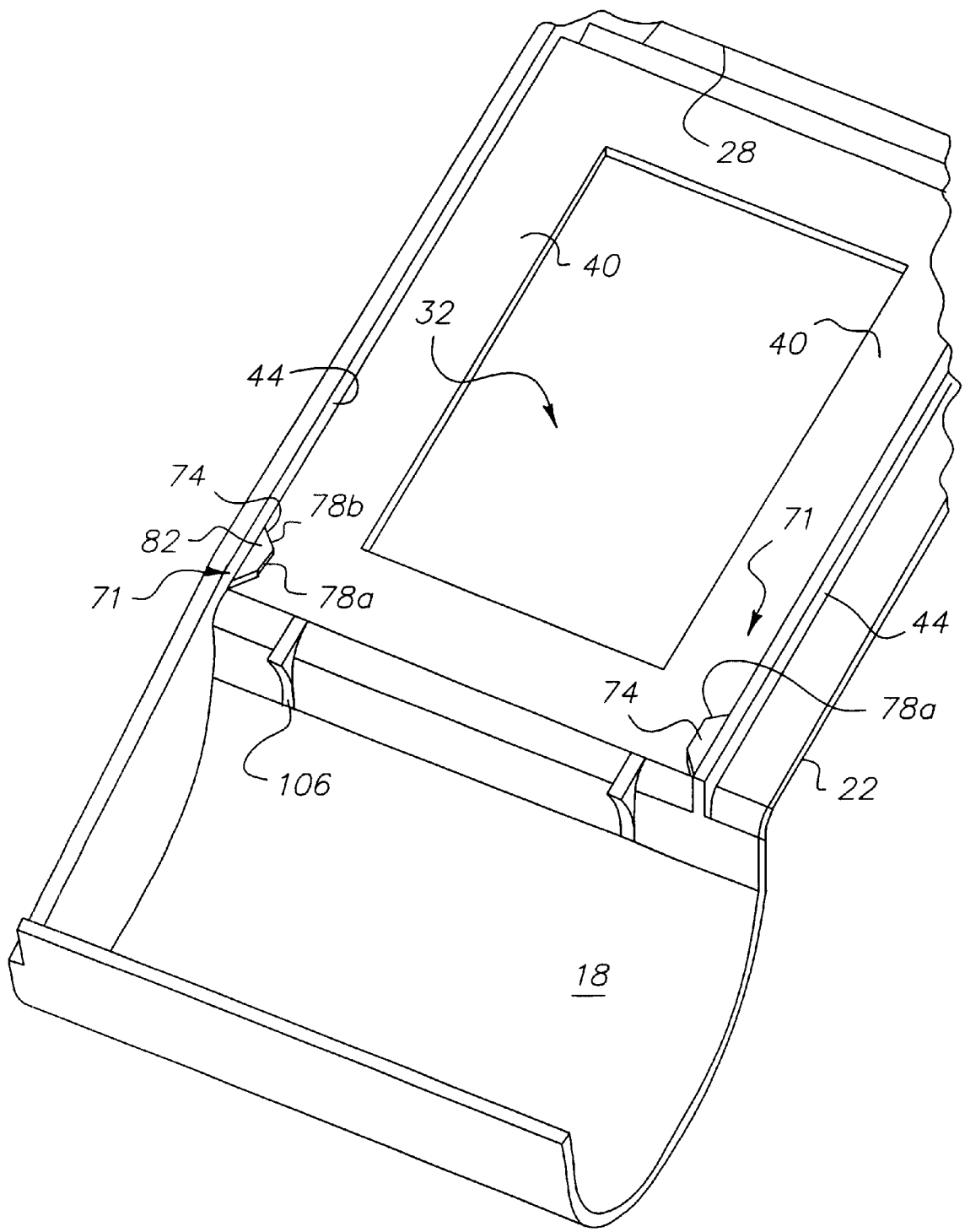
FIG. 7 is a left rear perspective view of another embodiment of the camera frame of FIG. 1. (For clarity, the baffle and some other features are not shown in this and other perspective views.)
Figure 8:
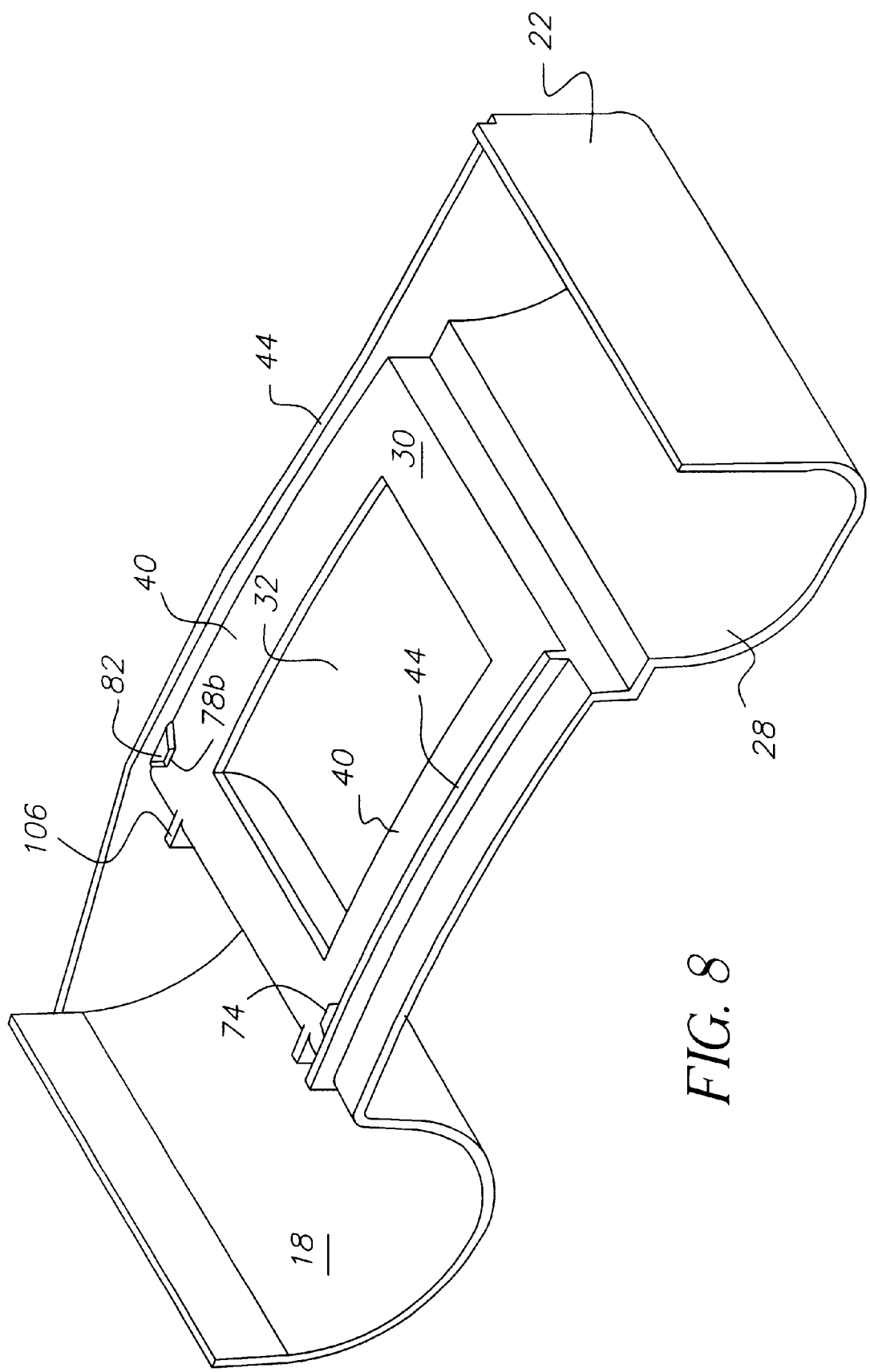
FIG. 8 is right rear perspective view of the camera frame of FIG. 1.
Figure 9:
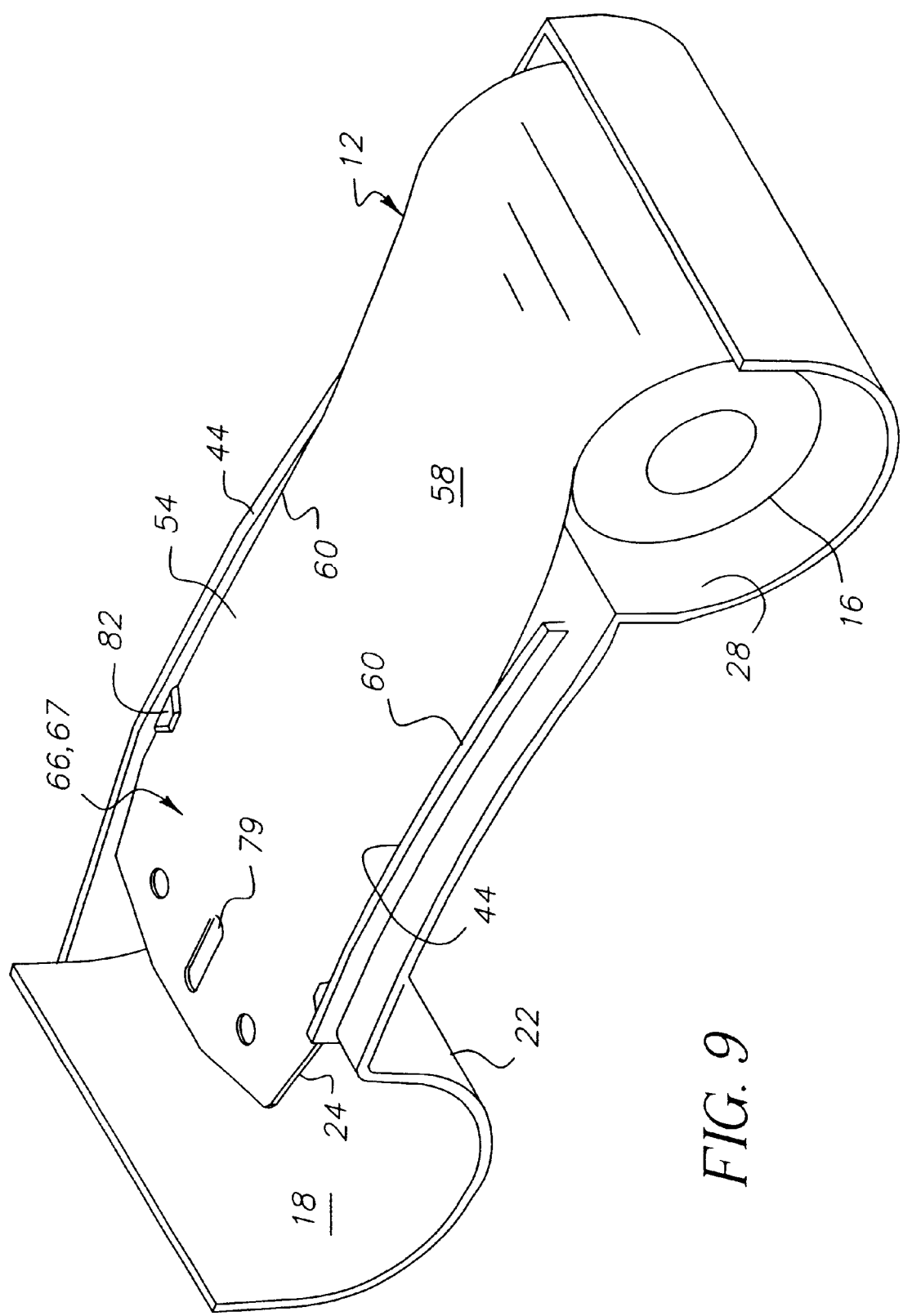
FIG. 9 is the same view as FIG. 8, but the position of the film unit after anchoring of the grip is also shown. The shape of the film return chamber of the camera frame in FIG. 9 is also slightly different than in FIG. 8.

Referring to FIG. 3, it is preferred that the methods are practiced as part of an assembly procedure that has both manual and automated assembly operations. The manual operations (indicated by box 150) are used for initial assembly steps including loading the film unit 14 in the frame 20 and draping the leading portion 54, through the step of engaging the retention zone 66 on the retention structure 70. Automated devices 152, shown in dashed lines in FIG. 3, can alternatively be used. In FIG. 3, transporting encompasses movement from the manual assembly station 150 through planar movement on a conveyor 154 into a dark enclosure 156 to light-protected stations 158 having automated devices, such as an automated film winding station having one of the discussed film winding devices (not separately identified in FIG. 3). The transporting is inclusive of intermediate movements, such as manual or powered movement prior to the conveyor 154. A controller 160 is illustrated in FIG. 3 having communication paths 161 to the automated devices. Cameras or incomplete camera frame assemblies are delivered from the dark enclosure to an output station, indicated by an arrow 162.

The invention has been described in detail with particular reference to certain preferred embodiments thereof, but it will be understood that variations and modifications can be effected within the spirit and scope of the invention.

What is claimed is:

1. A camera frame assembly comprising:
   a frame including a film return chamber, a film roll chamber spaced apart from said film return chamber, and a midsection extending between said chambers, said midsection having a pair of film guide surfaces, said film guide surfaces defining a film path between said chambers;
   a holdfast joined in fixed relation to said midsection adjacent said film roll chamber, said holdfast extending outward from said midsection toward said film path, said holdfast being fully outside said film path;
   a film unit having a film holder and a filmstrip, said film holder being seated in said film return chamber, said filmstrip having a leading portion having a free end and a grip adjoining said free end, said filmstrip having a main portion adjoining said leading portion, said filmstrip being movable between a first position wherein said grip engages said holdfast and a second position wherein said main portion occupies said film path and extends from one of said chambers to the other of said chambers.

2. The camera frame assembly of claim 1 further comprising a platen attachable to said frame to hold said filmstrip in said second position.

3. The camera frame assembly of claim 1 wherein said holdfast is recessed forward relative to said film guide surfaces.

4. The camera frame assembly of claim 3 wherein said holdfast has a pair of laterally spaced apart subunits.

5. The camera frame assembly of claim 4 wherein said film guide surfaces each include a cap, said caps being joined to respective said subunits of said holdfast.

6. The camera frame assembly of claim 4 wherein said midsection has a recess and said subunits are disposed in said recess.

7. The camera frame assembly of claim 1 wherein said holdfast overhangs said film roll chamber.

8. The camera frame assembly of claim 1 wherein said midsection has a pair of fences laterally adjoining respective said film guide surfaces, said fences each extending rearward.

9. The camera frame assembly of claim 8 wherein said holdfast has a pair of laterally spaced apart subunits, said subunits each being continuous with a respective said fence.

10. A camera frame assembly for use with a film unit having a filmstrip and a film holder, said filmstrip having a leading portion having a free end and a grip adjoining said free end, said camera frame assembly comprising:
    a film return chamber configured to receive said film holder;
    a film roll chamber spaced apart from said film return chamber;
    a midsection extending between said chambers, said midsection having an exposure opening and a pair of film guide surfaces adjoining said exposure opening; and
    a holdfast mounted in fixed relation to said midsection, said holdfast extending rearward, said holdfast having a cross-section matching a corresponding dimension of said grip, said holdfast being recessed forward relative to said film guide surfaces;
    whereby said holdfast can engage said grip, but said holdfast is spaced from said filmstrip when said filmstrip is disposed against said film guide surfaces.

11. The camera frame assembly of claim 10 wherein said holdfast has a pair of laterally spaced apart subunits.

12. The camera frame assembly of claim 11 wherein said film guide surfaces each include a cap, said caps being joined to respective said subunits of said holdfast.

13. The camera frame assembly of claim 11 wherein said midsection has a recess and said subunits are disposed in said recess.

14. The camera frame assembly of claim 10 wherein said holdfast overhangs said film roll chamber.

15. A transportable camera intermediate comprising:
    a frame including a film return chamber, a film roll chamber, and a midsection extending between said chambers, said midsection having a pair of opposed film guide surfaces defining a film path between said film chambers;
    a holdfast joined in fixed relation to said midsection, said holdfast extending outward from said midsection toward said film path, said holdfast being fully outside said film path;
    a film unit having a film holder and a filmstrip, said film holder being seated in said film return chamber, said filmstrip having a main portion held by said film holder and a leading portion adjoining said main portion and extending outward from said film holder, said leading portion having a free end disposed in said film roll chamber and a grip adjoining said free end, said grip engaging said holdfast.

16. The intermediate of claim 15 wherein said leading portion of said filmstrip intersects said film path.

17. The intermediate of claim 15 wherein said holdfast is recessed relative to said midsection.

18. The intermediate of claim 15 wherein said holdfast overhangs said film roll chamber.

19. The intermediate of claim 15 wherein said holdfast has a pair of spaced apart subunits and said film guide surfaces includes a pair of caps each said cap being joined to a respective said subunit.

20. The intermediate of claim 15 wherein said midsection has a recess and said holdfast is disposed in said recess.

21. The intermediate of claim 15 wherein said holdfast is laterally spaced from said film path.

22. A camera comprising:
    a frame including a film return chamber, a film roll chamber spaced apart from said film return chamber, and a midsection extending between said chambers, said midsection having a pair of film guide surfaces;
    a film unit having a filmstrip and a film holder, said filmstrip extending between said chambers, said filmstrip having a leading portion having a free end and a grip adjoining said free end;
    a platen attached to said frame, said platen holding said filmstrip against said film guide surfaces,
    a holdfast joined in fixed relation to said midsection, said holdfast extending outward from said midsection toward said filmstrip, said holdfast being spaced from said filmstrip, said holdfast and grip having respective contact surfaces having matching dimensions.

23. A camera frame assembly comprising:

a frame including a film return chamber, a film roll chamber, and a midsection extending between said chambers, said midsection having a pair of opposed film guide surfaces defining a film path between said film chambers;

a holdfast joined in fixed relation to said midsection, said holdfast extending outward from said midsection toward said film path, said holdfast being fully outside said film path;

a film unit having a film holder and a filmstrip, said film holder being seated in said film return chamber, said filmstrip having a main portion held by said film holder and a leading portion adjoining said main portion and extending outward from said film holder, said leading portion having a free end disposed in said film roll chamber and a grip configured to engage said holdfast, said grip adjoining said free end;

wherein said holdfast is recessed relative to said midsection.

24. A camera frame assembly comprising:

a frame including a film return chamber, a film roll chamber, and a midsection extending between said chambers, said midsection having a pair of opposed film guide surfaces defining a film path between said film chambers;

a holdfast joined in fixed relation to said midsection, said holdfast extending outward from said midsection toward said film path, said holdfast being fully outside said film path;

a film unit having a film holder and a filmstrip, said film holder being seated in said film return chamber, said filmstrip having a main portion held by said film holder and a leading portion adjoining said main portion and extending outward from said film holder, said leading portion having a free end disposed in said film roll chamber and a grip configured to engage said holdfast, said grip adjoining said free end;

wherein said holdfast overhangs said film roll chamber.

25. A camera frame assembly comprising:

a frame including a film return chamber, a film roll chamber, and a midsection extending between said chambers, said midsection having a pair of opposed film guide surfaces defining a film path between said film chambers;

a holdfast joined in fixed relation to said midsection, said holdfast extending outward from said midsection toward said film path, said holdfast being fully outside said film path;

a film unit having a film holder and a filmstrip, said film holder being seated in said film return chamber, said filmstrip having a main portion held by said film holder and a leading portion adjoining said main portion and extending outward from said film holder, said leading portion having a free end disposed in said film roll chamber and a grip configured to engage said holdfast, said grip adjoining said free end;

wherein said midsection has a recess and said holdfast is disposed in said recess.

* * * * *